United States Patent
Nakamura

(10) Patent No.: US 11,287,665 B2
(45) Date of Patent: Mar. 29, 2022

(54) IMAGE DISPLAY APPARATUS

(71) Applicant: Sony Corporation, Tokyo (JP)

(72) Inventor: Tomoharu Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/256,750

(22) PCT Filed: Jun. 27, 2019

(86) PCT No.: PCT/JP2019/025605
§ 371 (c)(1),
(2) Date: Dec. 29, 2020

(87) PCT Pub. No.: WO2020/008993
PCT Pub. Date: Jan. 9, 2020

(65) Prior Publication Data
US 2021/0263328 A1    Aug. 26, 2021

(30) Foreign Application Priority Data

Jul. 5, 2018   (JP) .............................. JP2018-128345

(51) Int. Cl.
*G03B 21/28*   (2006.01)
*G02B 27/28*   (2006.01)
(Continued)

(52) U.S. Cl.
CPC ........... *G02B 27/286* (2013.01); *G03B 21/28* (2013.01); *G03B 21/62* (2013.01); *G03B 37/04* (2013.01)

(58) Field of Classification Search
CPC ........ G03B 21/10; G03B 21/28; G03B 21/56; G03B 21/62; G03B 21/208; G03B 21/604;
(Continued)

(56) References Cited

U.S. PATENT DOCUMENTS 4,979,026 A * 12/1990 Lang ................... H04N 13/388
                                                            348/816
9,001,198 B2 * 4/2015 Ito ....................... H04N 13/341
                                                             348/58
(Continued)

FOREIGN PATENT DOCUMENTS

CN      102612664 A    7/2012
CN      103718104 A    4/2014
(Continued)

OTHER PUBLICATIONS

International Search Report issued in International Patent Application No. PCT/JP2019/025605 dated Aug. 20, 2019 and English translation of same. 5 pages.
(Continued)

*Primary Examiner* — Sultan Chowdhury
(74) *Attorney, Agent, or Firm* — K&L Gates LLP

(57) ABSTRACT

An image display apparatus according to an embodiment of the present technology includes an emitter, an irradiation target object, an optical unit, and a polarization control unit. The emitter emits image light along a predetermined axis. The irradiation target object is disposed in at least a part of an area around the predetermined axis. The optical unit is disposed to be opposite to the emitter by using the predetermined axis as a reference and causes the emitted image light to enter the irradiation target object. The polarization control unit controls a polarization state of the image light that enters the irradiation target object in accordance with a shape of the irradiation target object.

20 Claims, 9 Drawing Sheets

(51) Int. Cl.
*G03B 21/62* (2014.01)
*G03B 37/04* (2021.01)

(58) Field of Classification Search
CPC ............ G03B 21/2053; G03B 21/2073; H04N 9/3114; H04N 9/3155; H04N 9/3167; G02B 27/28; G02B 27/286; G02B 27/1026; G02B 27/1033
See application file for complete search history.

(56) References Cited

U.S. PATENT DOCUMENTS

| | | | | |
|---|---|---|---|---|
| 11,175,507 | B2* | 11/2021 | Jamali | G02B 26/106 |
| 11,175,576 | B2* | 11/2021 | Iguchi | H04N 9/3182 |
| 2005/0041218 | A1* | 2/2005 | Hoshino | G03B 21/28 |
| | | | | 353/94 |
| 2005/0094111 | A1 | 5/2005 | May | |
| 2009/0040474 | A1* | 2/2009 | Kamijima | G03B 21/208 |
| | | | | 353/85 |
| 2009/0096992 | A1 | 4/2009 | Amano | |
| 2012/0224109 | A1 | 9/2012 | Okagaki et al. | |
| 2016/0033855 | A1* | 2/2016 | Wong | G03B 21/62 |
| | | | | 353/13 |
| 2016/0139497 | A1 | 5/2016 | Usukura et al. | |
| 2017/0168294 | A1 | 6/2017 | Yamaguchi et al. | |
| 2017/0269360 | A1 | 9/2017 | Yamaguchi et al. | |
| 2018/0131913 | A1* | 5/2018 | Nakagoshi | G03B 21/006 |

FOREIGN PATENT DOCUMENTS

| | | |
|---|---|---|
| CN | 107783308 A | 3/2018 |
| JP | 11-338056 A | 12/1999 |
| JP | 2001-042260 A | 2/2001 |
| JP | 2001-330891 A | 11/2001 |
| JP | 2003-344962 A | 12/2003 |
| JP | 2006-243429 A | 9/2006 |
| JP | 2006-308745 A | 11/2006 |
| JP | 2007-218945 A | 8/2007 |
| JP | 2013-250561 A | 12/2013 |
| JP | 2014-191177 A | 10/2014 |
| JP | 2016-200682 A | 12/2016 |
| JP | 2017-111429 A | 6/2017 |
| JP | 2017-173788 A | 9/2017 |
| WO | WO2011/070777 A1 | 6/2011 |
| WO | WO2012063428 A1 | 5/2012 |
| WO | WO2014188978 A1 | 11/2014 |

OTHER PUBLICATIONS

Written Opinion issued in International Patent Application No. PCT/JP2019/025605 dated Aug. 20, 2019. 8 pages.

* cited by examiner

IMAGE DISPLAY APPARATUS

TECHNICAL FIELD

The present technology relates to an image display apparatus that displays an image on a screen or the like.

BACKGROUND ART

Conventionally, a technology for displaying an image by projecting the image on a screen or the like is known. Patent Literature 1 has disclosed an image display system for reducing specular reflection on a transparent screen having a smooth surface. In this image display system, image light is projected from an obliquely downward part of the transparent screen by an ultrashort-focus projector. A polarizing plate that transmits light polarized in a specific direction is disposed between the projector and the transparent screen. The polarizing plate adjusts the image light such that the P-polarized components are dominant in a center portion of the transparent screen. Accordingly, specular reflection on the transparent screen is reduced, and it is possible to reduce generation of an unnecessary image due to reflection of the image light (paragraphs [0022], [0024], [0026], and [0036] in the specification, FIG. 1, and the like in Patent Literature 1).

CITATION LIST

Patent Literature

Patent Literature 1: Japanese Patent No. 6167340

DISCLOSURE OF INVENTION

Technical Problem

In recent years, a technology for displaying an all-around image or the like using an all-around screen or the like has been developed. Also in such an all-around screen or the like, it is important to reduce the influence of reflection, and it is desirable to provide a technology capable of realizing high-quality image display on the all-around screen or the like.

In view of the above-mentioned circumstances, it is an object of the present technology to provide an image display apparatus capable of realizing high-quality image display on an all-around screen or the like.

Solution to Problem

In order to accomplish the above-mentioned object, an image display apparatus according to an embodiment of the present technology includes an emitter, an irradiation target object, an optical unit, and a polarization control unit.

The emitter emits image light along a predetermined axis.

The irradiation target object is disposed in at least a part of an area around the predetermined axis.

The optical unit is disposed to be opposite to the emitter by using the predetermined axis as a reference and causes the emitted image light to enter the irradiation target object.

The polarization control unit controls a polarization state of the image light that enters the irradiation target object in accordance with a shape of the irradiation target object.

In this image display apparatus, the image light emitted from the emitter along the predetermined axis enters the optical unit disposed to be opposite to the emitter. The optical unit causes the emitted image light to enter the irradiation target object disposed in at least the part of the area around the predetermined axis. Further, the polarization control unit controls the polarization state of the image light that enters the irradiation target object in accordance with the shape of the irradiation target object. With this configuration, it is possible to achieve high-quality image display on an all-around screen or the like.

The polarization control unit may control a polarization direction of the image light as the polarization state of the image light.

With this configuration, the polarization direction of the image light that enters the irradiation target object is controlled, and it is possible to reduce reflection of the image light and the like. As a result, it is possible to achieve bright image display and the like.

The irradiation target object may include an interface that the image light enters. In this case, the polarization control unit may control the polarization direction of the image light such that an angle of the polarization direction of the image light with respect to a normal direction of a plane of incidence is substantially constant, the plane of incidence including a direction of incidence of the image light with respect to the interface and a normal direction of the interface at a position of incidence of the image light.

With this configuration, it is possible to reduce unevenness of reflection of the image light on the interface and the like. As a result, it is possible to achieve high-quality image display with no luminance unevenness on the all-around screen or the like.

The polarization control unit may control the polarization direction of the image light such that the plane of incidence and the polarization direction of the image light are parallel to each other.

With this configuration, it is possible to greatly reduce reflection of the image light on the interface. As a result, it is possible to achieve high-quality image display at a high luminance on the all-around screen or the like.

The shape of the irradiation target object may include a rotationally symmetric shape having the predetermined axis as a substantially center axis. In this case, the polarization control unit may control the polarization state such that a distribution of polarization directions of the image light are symmetric with respect to the predetermined axis.

With this configuration, for example, it is possible to uniformly reduce reflection on the screen having the rotationally symmetric shape. As a result, it is possible to sufficiently reduce luminance unevenness of the image display and the like.

The polarization control unit may convert the image light into radially polarized light.

With this configuration, for example, it is possible to sufficiently reduce reflection on the screen having the rotationally symmetric shape. As a result, it is possible to greatly enhance the luminance of the image display.

The irradiation target object may be disposed in an area all around the predetermined axis.

With this configuration, an all-around screen is configured around the predetermined axis, and it is possible to enjoy a bright all-around image and the like.

The irradiation target object may be constituted by a cylindrical shape having the predetermined axis as a substantially center axis.

With this configuration, it is possible to achieve high-quality image display on a cylindrical all-around screen or the like.

The optical unit may control an angle of incidence of the emitted image light with respect to the irradiation target object.

With this configuration, it is possible to easily control the amount of reflection of the image light on the irradiation target object or the like, and it is possible to easily reduce luminance unevenness, lowering of the luminance, and the like.

The optical unit may control the angle of incidence of the image light with respect to the irradiation target object to be 45° or more and 75° or less.

With this configuration, it is possible to sufficiently reduce the amount of reflection of the image light on the irradiation target object or the like, and it is possible to avoid luminance unevenness, lowering of the luminance, and the like and achieve high-quality image display.

The optical unit may make the angle of incidence of the image light with respect to the irradiation target object substantially constant.

With this configuration, it is possible to sufficiently reduce luminance unevenness, lowering of the luminance, and the like. As a result, it is possible to sufficiently achieve high-quality image display on the all-around screen or the like.

The optical unit may include a reflection surface that reflects the image light emitted from the emitter to the irradiation target object.

With this configuration, it is possible to easily irradiate the irradiation target object with the image light via the reflection surface.

The polarization control unit may include a rotator that rotates each of polarization directions of light rays that enter respective points in accordance with the shape of the irradiation target object.

With this configuration, for example, it is possible to control the polarization direction of the image light with high accuracy. As a result, the influence of reflection on the irradiation target object is reduced, and it is possible to achieve high-quality image display.

The polarization control unit may include a polarization plate that aligns the polarization directions of the entering light rays and emits linearly polarized light rays. In this case, the rotator may rotate each of the polarization directions of the linearly polarized light rays that enter respective points.

With this configuration, for example, even in a case where the image light that is unpolarized light having no particular polarization directions, it is possible to control the polarization direction of the image light with high accuracy.

The polarization control unit may be disposed to be opposite to the emitter by using the predetermined axis as a reference.

With this configuration, for example, it is possible to easily dispose the polarization control unit, and it is possible to easily control the polarization state of the image light.

The polarization control unit may be disposed inside the emitter. In this case, the emitter may emit the image light having the polarization state controlled along the predetermined axis.

With this configuration, it is possible to generate the image light having the polarization state controlled with high accuracy, and it is possible to sufficiently enhance the quality of the image display.

The polarization control unit may include a light-emitting element that emits the image light having the polarization state controlled.

With this configuration, it is possible to easily generate the image light having the polarization state controlled with high accuracy, and it is possible to easily enhance the quality of the image display.

The irradiation target object may include a screen using a diffractive optical element.

By using the diffractive optical element, it is possible to sufficiently achieve high-quality image display.

The irradiation target object may include at least one of a transmissive screen that transmits the image light or a reflective screen that reflects the image light.

With this configuration, for example, it is possible to arbitrarily set a surface on which an image is displayed. As a result, for example, it is possible to display an all-around image directed outward, an all-around image directed inward, and the like.

The irradiation target object may be light-transmissive.

With this configuration, it is possible to realize an all-around screen through which the background is visible and the like, and it is possible to display a see-through all-around image and the like.

Advantageous Effects of Invention

As described above, in accordance with the present technology, it is possible to achieve high-quality image display on an all-around screen or the like. It should be noted that the effects described here are not necessarily limitative and any effect described in the present disclosure may be provided.

MODE(S) FOR CARRYING OUT THE INVENTION

Hereinafter, embodiments according to the present technology will be described with reference to the drawings.

[Configuration of Image Display Apparatus]

Figure 1:
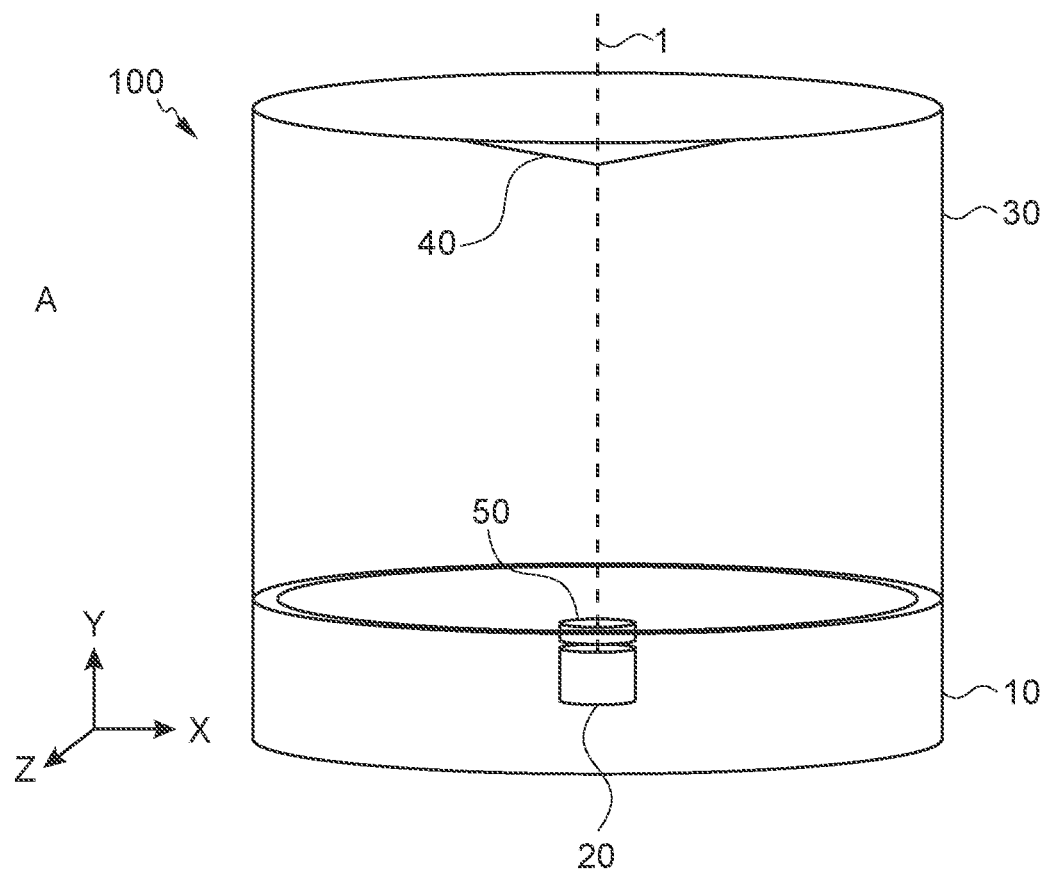
FIG. 1 A schematic diagram showing a configuration example of an image display apparatus according to an embodiment of the present technology.
Figure 1:
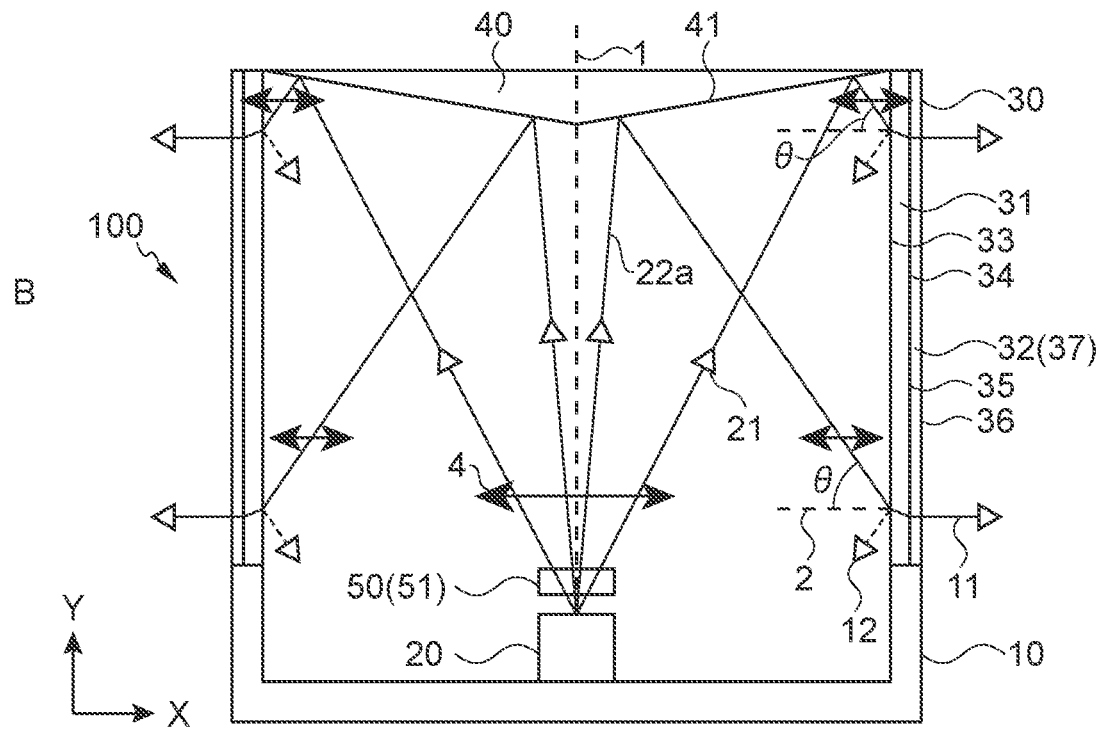

FIG. 1 is a schematic diagram showing a configuration example of an image display apparatus according to an embodiment of the present technology. FIG. 1A is a perspective view showing an outer appearance of an image display apparatus 100. FIG. 1B is a cross-sectional view schematically showing a configuration of the image display apparatus 100.

In this embodiment, the description will be given assuming that a direction of a surface (XZ plane) on which the image display apparatus 100 is disposed is defined as a horizontal direction and a direction (Y direction) perpendicular to it is defined as upper and lower directions. As a matter of course, the present technology can be applied irrespective of the direction in which the image display apparatus 100 is disposed.

The image display apparatus 100 includes a pedestal 10, an emitter 20, a screen 30, a reflection mirror 40, and a polarization control unit 50.

The pedestal 10 has a cylindrical shape and is provided in a lower part of the image display apparatus 100. The pedestal 10 retains the emitter 20, the screen 30, the reflection mirror 40, and the polarization control unit 50 through an arbitrary retaining mechanism (not shown). Further, the pedestal 10 is provided as appropriate with a power supply source such as a battery (not shown), a speaker, other elements necessary for operation of the image display apparatus 100, sensing devices for performing recognition processing such as speech recognition and image recognition, and the like. The shape and the like of the pedestal 10 are not limited, and an arbitrary shape such as a rectangular parallelepiped shape may be used, for example.

The emitter 20 is installed substantially at a center position of the cylindrical pedestal 10, directed upward. The emitter 20 emits image light 21 that constitutes an image along an optical axis 1 extending in the upper and lower directions (Y direction). The image light 21 is constituted by light (light ray) for displaying each pixel, for example. In this embodiment, the optical axis 1 corresponds to a predetermined axis. It should be noted that the image light 21 passes through the polarization control unit 50 to be described later and is emitted toward an upper part of the image display apparatus 100.

The FIG. 1B shows a cross-section of the image display apparatus 100 taken in a direction of an arbitrary plane including the optical axis 1. The emitter 20 emits the image light 21 radially along the optical axis 1. Thus, as shown in FIG. 1B, on an arbitrary plane including the optical axis 1, the image light 21 is emitted at a predetermined angle of view from the emitter 20. In FIG. 1B, an inner optical path 22a of the angle of emission having a smaller angle of emission and closer to the optical axis 1 and an outer optical path 22b having a larger angle of emission and further from the optical axis 1 are schematically shown. Here, the angle of emission is an angle formed by the optical axis 1 and an optical path of light corresponding to each pixel of the image light 21, for example.

For example, a color projector or the like of a laser scanning system that displays each pixel by scanning laser light corresponding to each color of RGB is used as the emitter 20. The specific configuration of the emitter 20 is not limited, and for example, a small mobile projector (pico projector), a projector using single-color laser light, or the like may be used as appropriate in accordance with the size of the image display apparatus 100, applications, and the like. Otherwise, an arbitrary projector capable of projecting the image light 21 may be used.

For example, a projection device (projector) including a light-emitting element using a laser diode (LD) and light modulation element using a light-emitting diode (LED), or the like, micro electro mechanical systems (MEMS), a digital mirror device (DMD), reflective liquid crystal, transmissive liquid crystal, and the like may be used as appropriate as the emitter 20. That is, a projection device or the like having a configuration such as LD+MEMS, LD+DMD, LD+reflective liquid crystal, LD+transmissive liquid crystal, LED+MEMS, LED+DMD, LED+reflective liquid crystal, and LED+transmissive liquid crystal may be used. As a matter of course, the present technology can be applied also in a case where a projection device having another configuration is used.

In this embodiment, it is assumed that linearly polarized light polarized in a constant direction is emitted as the image light 21. Therefore, for example, light rays corresponding to the respective pixels of the image light 21 become linearly polarized light rays polarized in directions similar to each other.

The screen 30 has a cylindrical shape and is disposed in an area all around the optical axis 1. In this embodiment, the screen 30 is provided such that a center axis of the screen 30 (cylindrical shape) substantially coincides with the optical axis 1 of the emitter 20. Thus, the screen 30 has a rotationally symmetric shape having the optical axis 1 as the substantially center axis.

In the example shown in FIG. 1A, the screen 30 having a diameter similar to that of the pedestal 10 is shown. The present technology is not limited thereto, and the diameter, height, and the like of the screen 30 may be set as appropriate. It should be noted that in the FIG. 1A, the structure of the screen 30 in a thickness direction (cross-section) is shown in a simplified manner. In this embodiment, the screen 30 corresponds to an irradiation target object.

The screen 30 has a cylindrical base member 31 and an optical film 32. The cylindrical base member 31 is a light-transmissive cylindrical base member that transmits light. The cylindrical base member 31 includes a first surface 33 which is an inner surface of the cylinder and a second surface 34 which is an outer surface of the cylinder. The cylindrical base member 31 functions as a support member that supports the optical film 32. The cylindrical base member 31 is formed from transparent materials (plastic material such as an acrylic resin, glass, and the like), for example. The specific configuration of the cylindrical base member 31 is not limited. For example, the cylindrical base member 31 may be configured by using a sufficiently transparent material having a high transmittance, a semi-transparent material having a predetermined transmittance (e.g., 30% or the like), or the like.

The optical film 32 is a film having an optical function for displaying an image. The optical film 32 has a third surface 35 and a fourth surface 36 that are opposite to each other at front and back. The optical film 32 is disposed to be bonded to the cylindrical base member 31 such that the third surface 35 is in contact with the second surface 34 outside the cylindrical base member 31. That is, the optical film 32 is bonded over the entire area outside the cylindrical base member 31. Further, the optical film 32 is formed from light-transmissive materials. Therefore, the screen 30 is a cylindrical screen which is light-transmissive and through which the background is visible, for example.

In this embodiment, the optical film 32 constituted by an diffractive optical element is used. Therefore, the screen 30 is a screen using the diffractive optical element. The diffractive optical element (DOE) is an optical element that diffracts light. For example, a holographic optical element (HOE) that diffracts light by using interference fringes recorded on a hologram or the like is used as the diffractive optical element.

The specific configuration of the diffractive optical element is not limited. For example, a volume HOE in which interference fringes are recorded inside the element, a relief (embossing) HOE in which interference fringes are recorded as irregularities or the like of the element surface, or the like may be used. These HOEs can be constituted using a material such as a photopolymer (photosensitive material or the like) and a UV curable resin, for example. Alternatively, a diffractive optical element of a type that diffracts light by using a diffraction grating or the like in a predetermined pattern or the like may be used other than diffraction by interference fringes.

In this embodiment, a transmissive hologram (transmissive HOE 37) is used as the diffractive optical element. The transmissive HOE 37 is a hologram that controls a traveling direction of light entering from one surface and emits the light from the other surface. Therefore, for example, light entering from inside the screen 30 is emitted outward from the screen 30. Therefore, the screen 30 is a transmissive screen that transmits the image light 21.

In interference fringes of light diffused by a diffusion plate are recorded on the transmissive HOE 37, for example, and a diffusion function that diffracts incident light and emits it as diffused light 11. By emitting the diffused light 11, it is possible to display an image on the transmissive HOE 37 (screen 30). In FIG. 1B, the diffused light 11 emitted from the transmissive HOE 37 is schematically shown.

Thus, the screen 30 has a double structure in which the transparent cylindrical base member 31 is disposed on the inside and the transmissive HOE 37 (optical film 32) is disposed on the outside. In this configuration, the first surface 33 inside the cylindrical base member 31 is a surface that the image light 21 enters and the fourth surface 36 of the transmissive HOE 37 is a surface from which the image light 21 is emitted. In this embodiment, the first surface 33 corresponds to an interface that the image light enters.

It should be noted that the specific configuration of the screen 30 is not limited, and for example, the optical film 32 may be disposed inside the cylindrical base member 31. Alternatively, the transmissive HOE 37 may be configured by directly applying a material (photopolymer) capable of recording interference fringes to the cylindrical base member rather than bonding the films. Alternatively, it is made to function as a relief hologram by directly recording irregularities or the like in which interference fringes are recorded on the surface of the cylindrical base member 31. Such a configuration is also possible.

The reflection mirror 40 has a reflection surface 41 that reflects the image light 21 emitted from the emitter 20 to the screen 30. The reflection mirror 40 is disposed to be opposite to the emitter 20 by using the optical axis 1 as a reference such that the reflection surface 41 faces the emitter 20.

The image light 21 entering the reflection mirror 40 is reflected on the reflection surface 41 and emitted toward the screen 30. That is, the reflection mirror 40 causes the image light 21 emitted from the emitter 20 to enter the screen 30. In this embodiment, the reflection mirror 40 corresponds to an optical unit.

In this embodiment, the reflection surface 41 has a rotationally symmetric shape using the optical axis 1 as a reference. Specifically, the reflection surface 41 includes a rotation surface obtained by rotating a curve cut out from a part of a parabola by using the optical axis 1 as a reference.

The rotation surface is configured such that a side that is the concave of the parabola (side of the focus of the parabola) is a side on which light is reflected (reflection surface 41) and also that the axis of the parabola is different from the optical axis 1. It should be noted that in FIG. 1B, the cross-sectional shape of the reflection surface 41 is schematically shown with the straight line.

As shown in FIG. 1B, in this embodiment, the reflection surface 41 has a shape having a vertex on the optical axis 1. That is, a point at which the rotation surface intersects with the optical axis 1 in the reflection surface 41 has a convex shape as viewed from the emitter 20. Further, in the cross-sectional shape of the reflection mirror 40, left and right curves across the optical axis 1 have a parabola shape having a concave as viewed from the emitter 20.

By using a paraboloid using the parabola as the reflection surface 41 in this manner, it is possible to control a direction in which the image light 21 is reflected, i.e., a direction of incidence on the screen 30. Therefore, the reflection mirror 40 is capable of controlling an angle of incidence θ of the image light 21 emitted from the emitter 20 with respect to the screen 30.

Here, the angle of incidence θ is an angle of the direction of incidence of the image light 21 (e.g., a direction of each of the optical paths 22a and 22b) with respect to a normal direction 2 at a point of incidence of the image light 21 on the screen 30.

The specific configuration and the like of the reflection mirror 40 are not limited. For example, an arbitrary material such as a resin such as an acrylic resin, glass, and metal may be used as a constituent material of the reflection mirror 40. For example, the reflection mirror 40 is configured by mirror-finishing on the surfaces of these materials such that the surface roughness Ra<0.1 μm. Additionally, an arbitrary material may be used for the reflection mirror 40 in accordance with the machining accuracy, the productivity, and the like, for example.

Further, for example, the reflection surface 41 of the reflection mirror 40 may be subjected to highly-reflective coating or the like with a thin film of aluminum, silver, or the like. Accordingly, it is possible to highly efficiently reflect the image light 21 entering the reflection surface 41. Further, protective coating or the like for protecting the reflection surface 41 using a thin film such as a SiO2 film and a polymerized film may be applied to a surface of the surface of reflection 41 as appropriate. Additionally, materials and the like for highly-reflective coating, protective coating, or the like are not limited.

The polarization control unit 50 is disposed to be opposite to the emitter 20 by using the optical axis 1 as a reference. The polarization control unit 50 is disposed at a position such that the entire image light 21 emitted radially from the emitter 20 can pass through the polarization control unit 50, for example.

The polarization control unit 50 controls the polarization state of the image light 21 emitted from the emitter 20. Specifically, the polarization control unit 50 controls the polarization direction of the image light 21 as the polarization state of the image light 21. For example, the polarization control unit 50 controls each of polarization directions of the light (light rays) corresponding to the respective pixels of the image light 21. Therefore, the light passing through the polarization control unit 50 includes linearly polarized light polarized in different directions.

Figure 2:
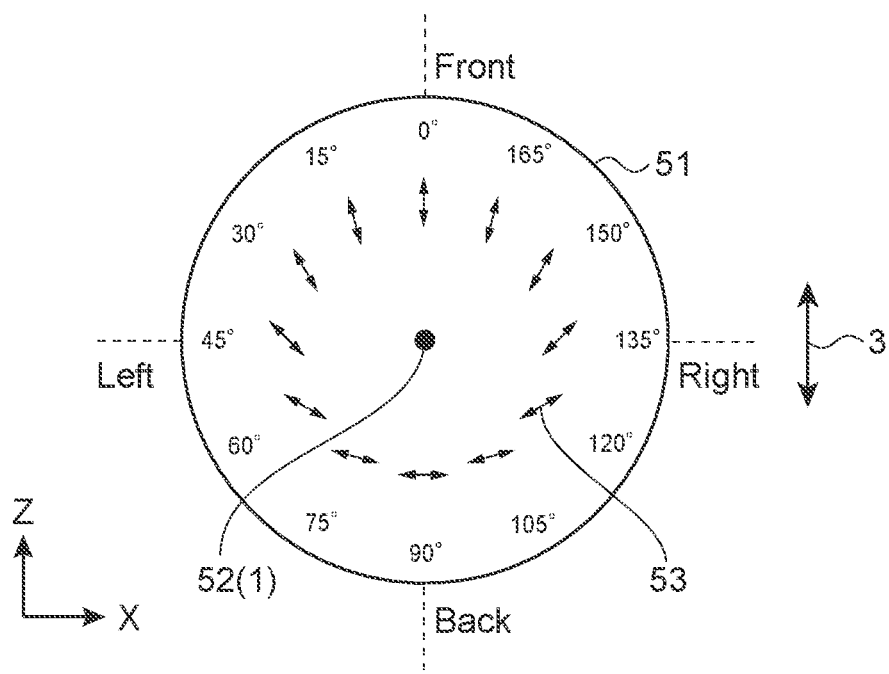
FIG. 2 A schematic diagram showing a configuration example of an axially symmetric wave plate.
Figure 3:
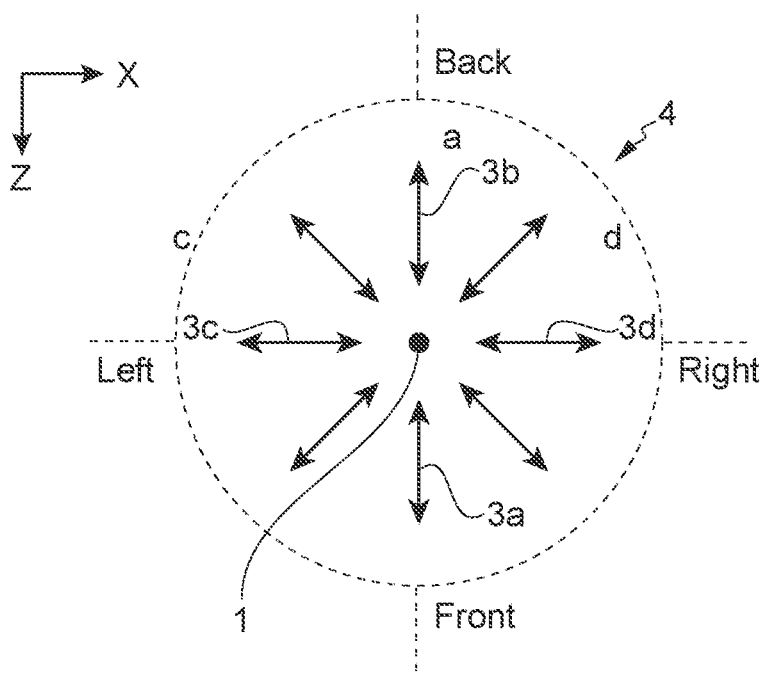
FIG. 3 A schematic diagram showing a polarization direction of light emitted from the axially symmetric wave plate.

In this embodiment, the polarization control unit 50 is configured using an axially symmetric wave plate 51. FIG. 2 is a schematic diagram showing a configuration example of the axially symmetric wave plate 51. FIG. 3 is a schematic diagram showing a polarization direction of light emitted from the axially symmetric wave plate 51.

The axially symmetric wave plate 51 has, for example, a disc shape centered on the center axis 52 and is disposed such that the center axis 52 coincides with the optical axis 1. In FIG. 2, the axially symmetric wave plate 51 as viewed from the emitter 20 along a direction parallel to the optical axis 1 is schematically shown. Hereinafter, the description will be given assuming that the upper side of FIG. 2 corresponds to a front side of the image display apparatus 100. Thus, the upper and lower directions in the figure correspond to front and back directions (Z axis direction) of the image display apparatus 100 and the left and right directions in the figure correspond to the left and right directions (X axis direction) as the image display apparatus 100 is viewed from the front side.

The axially symmetric wave plate 51 rotates the polarization direction of incident light with an amount of rotation depending on the position of incidence. Specifically, the axially symmetric wave plate 51 rotates each of the polarization directions of light rays entering the respective points in accordance with the shape of the screen 30. In this embodiment, the axially symmetric wave plate 51 corresponds to a rotator.

The axially symmetric wave plate 51 has a structure in which an optical axis 53 of a half-wave plate has continuously changed rotating about the center axis 52 (optical axis 1). In FIG. 3, the optical axis 53 for each position is schematically shown with the arrows.

In general, the polarization direction of linearly polarized light 3 entering the half-wave plate is emitted after the polarization direction of linearly polarized light 3 is rotated by an angle $2a$ twice an angle $\alpha$ of intersection with the optical axis 53. In the axially symmetric wave plate 51, this optical axis 53 is set to continuously change over the entire area around the center axis 52 in the range of 0° to 180°. Hereinafter, the direction of the optical axis 53 set to 0° is referred to as a reference direction. In the example shown in FIG. 2, the reference direction is set to be parallel to the front and back directions (Z axis direction).

For example, it is assumed that the linearly polarized light 3 having the polarization direction parallel to the reference direction enters the entire surface of the axially symmetric wave plate 51. In this case, the linearly polarized light 3 entering the position (front side) at which the optical axis 53 is set to 0°
and the linearly polarized light 3 entering the position (back side) at which the optical axis 53 is set to 90° are emitted as they are with the polarization directions not rotated. As a result, as shown in FIG. 3, linearly polarized light 3a and linearly polarized light 3b parallel to the front and back directions (Z axis direction) are emitted from the front and back sides of the axially symmetric wave plate 51.

Further, for example, the linearly polarized light 3 entering the position (left side) at which the optical axis 53 is set to 45° and the linearly polarized light 3 entering the position (right side) at which the optical axis 53 is set to 135° are rotated by 90° and 270°, respectively. Thus, as shown in FIG. 3, linearly polarized light 3c and linearly polarized light 3d parallel to the left and right directions (X axis direction) are emitted from the left and right sides of the axially symmetric wave plate 51. The polarization direction of the linearly polarized light 3 entering another position is also rotated in accordance with the angle of the optical axis 53, which is set at the position of incidence.

Thus, the linearly polarized light 3 parallel to the reference direction is emitted as the linearly polarized light 3 polarized in a direction (radial direction) parallel to a diagonal with respect to the optical axis 1. Thus, as shown in FIG. 3, the axially symmetric wave plate 51 converts the linearly polarized light 3 parallel to the reference direction into radially polarized light 4 having the polarization directions radially distributed in a radial direction having the optical axis 1 as a center.

It should be noted that even when the linearly polarized light 3 deviated from the reference direction is made incident, the linearly polarized light 3 polarized in directions parallel to each other is emitted from positions on the diagonal with respect to the optical axis 1. Therefore, it can be also said that the axially symmetric wave plate 51 is an axially symmetric polarization conversion element that rotates the incident linearly polarized light 3 in the polarization direction that is rotationally symmetric with respect to the optical axis 1 (center axis 52).

Figure 4:
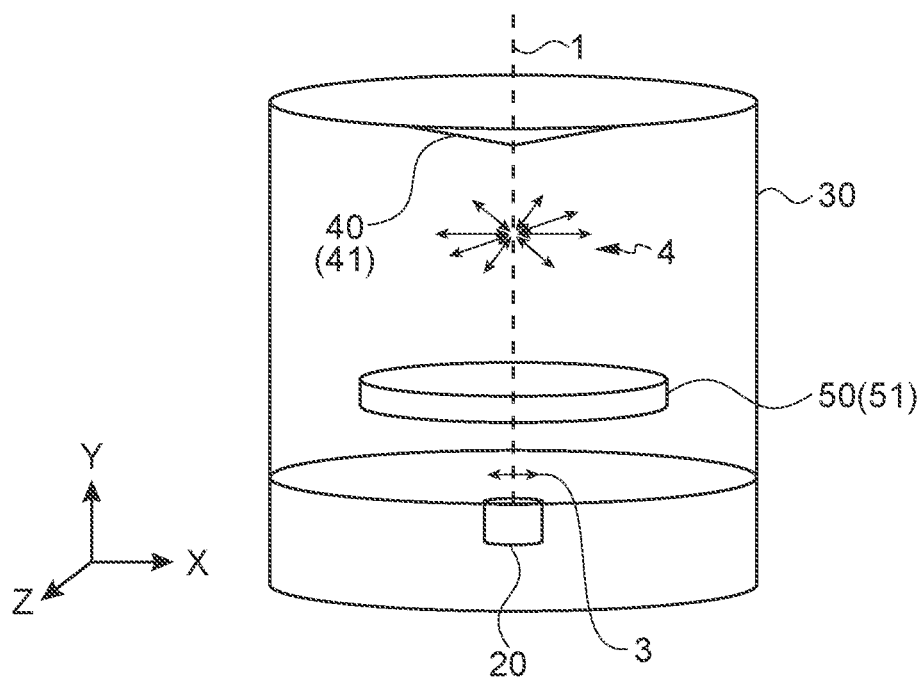
FIG. 4 A schematic diagram showing an example of polarization conversion by a polarization control unit.

FIG. 4 is a schematic diagram showing an example of polarization conversion by the polarization control unit 50. In FIG. 4, the polarization state of the image light 21 emitted from the emitter 20 and the polarization state of the image light 21 converted by the polarization control unit 50 are schematically shown with the arrows.

As described above, in this embodiment, the image light 21 (linearly polarized light 3) polarized in a constant direction is emitted from the emitter 20 toward the axially symmetric wave plate 51. Then, the axially symmetric wave plate 51 (polarization control unit 50) controls the polarization state such that the distribution of the polarization directions of the image light 21 is symmetric with respect to the optical axis 1. The image light 21 polarized symmetrically with respect to the optical axis 1 is reflected on the reflection surface 41 and enters the screen 30 radially about the optical axis 1.

Thus, by converting the image light 21 into the polarization direction symmetric with respect to the optical axis 1, it is possible to align the polarization states (polarization directions and the like) of the image light 21 with respect to the cylindrical screen 30.

The reference direction of the axially symmetric wave plate 51 is set to coincide with the polarization direction of the image light 21 emitted from the emitter 20. Therefore, the radially polarized light 4 (see FIG. 3) is emitted from the axially symmetric wave plate 51. That is, the axially symmetric wave plate 51 converts the image light 21 into the radially polarized light 4.

It should be noted that the specific configuration of the polarization control unit 50 is not limited. For example, a region division wave plate or the like in which the optical axis 53 is set to rotate about the center axis 52 stepwise for each region may be used as the axially symmetric wave plate 51.

Alternatively, instead of the axially symmetric wave plate 51, another optical element may be used as the polarization control unit 50. For example, a liquid crystal converter or the like that performs radial polarization by adjusting the liquid crystal array may be used. By using the liquid crystal converter, the radial polarization of the image light 21 can be achieved with high accuracy. Additionally, any optical element capable of generating the radially polarized light 4 or the like may be used.

Figure 5:
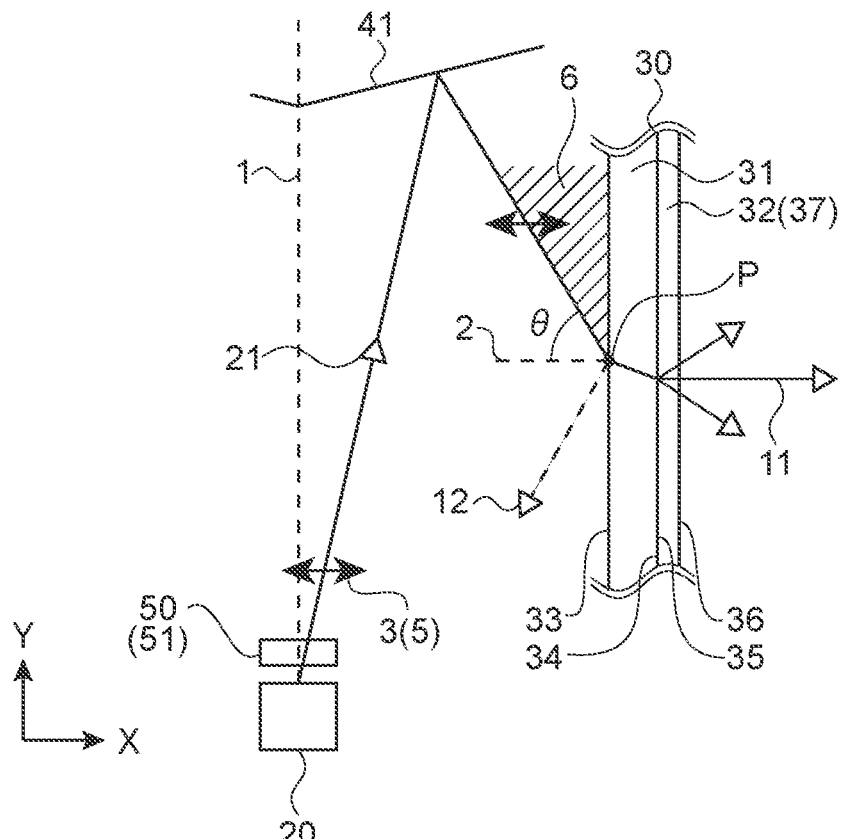
FIG. 5 A schematic diagram showing an example of an optical path of image light of the image display apparatus.

FIG. 5 is a schematic diagram showing an example of an optical path of the image light 21 of the image display apparatus 100. The image light 21 polarized in a constant direction is emitted upward from the emitter 20 radially along the optical axis 1. The emitted image light 21 enters the polarization control unit 50 (axially symmetric wave plate 51) and is converted into the radially polarized light 4 having the polarization directions distributed radially with respect to the optical axis 1.

The polarization directions of the radially polarized image light 21 are, in a cross-section including the optical axis 1, directions parallel to the cross-section. For example, in FIG. 5, the image light 21 passing through the polarization control unit 50 is linearly polarized light polarized in a direction parallel to the XY plane (sheet). The polarization direction 5 parallel to the XY plane is schematically shown in FIGS. 1 and 5 with the arrows parallel to the X direction.

It should be noted that the polarization direction of the linearly polarized light is a direction orthogonal to the traveling direction. Therefore, the actual polarization direction 5 of the radially polarized image light 21 is parallel to the XY plane and is a direction orthogonal to the traveling direction (optical path).

The radially polarized image light 21 enters the reflection surface 41 of the reflection mirror 40. As described above, the reflection surface 41 has the parabolic rotation surface. Therefore, for example, as shown in FIG. 1B, the angle of incidence θ of the image light 21 reflected on the reflection surface 41 with respect to the screen 30 is substantially constant. That is, the reflection mirror 40 controls the angle of incidence θ of the image light 21 with respect to the screen 30 to be substantially constant.

It should be noted that in the present disclosure, the substantially constant angle of incidence θ includes angles of incidence θ within an angle range (allowable angle range) in which image display can be properly performed. This allowable angle range is set in accordance with reflectance characteristics (see FIG. 6) on the screen 30 (cylindrical base member 31), diffraction characteristics of the screen 30 (transmissive HOE 37), and the like, for example.

Further, before and after the reflection on the reflection surface 41, the polarization state of the light is saved. Therefore, rotation and the like of the polarization direction 5 with respect to the traveling direction of the image light 21 do not occur. For example, as shown in FIG. 5, the polarization direction 5 of the image light 21 entering the reflection surface 41 along the XY plane is a direction parallel to the XY plane even after it is reflected on the reflection surface 41.

That is, polarized components and the like in the Z axis direction (direction orthogonal to the sheet) are not generated before and after the reflection. As a matter of course, the polarization direction 5 of the image light 21 incident along any plane including the optical axis 1, not limited to the XY plane, is saved before and after the reflection. It should be noted that since the traveling direction of the image light 21 changes before and after the reflection, the orientation of the polarization direction 5 in the plane including the optical axis 1 changes in accordance with a direction of reflection.

The image light 21 reflected on the reflection surface 41 enters the first surface 33 inside the cylindrical base member 31 at a predetermined angle of incidence θ. At this time, in the first surface 33 serving as an interface of incidence, surface reflection depending on a difference (interface refractive index difference) in refractive index between the air and the cylindrical base member 31 occurs in some cases. In FIGS. 1 and 5, reflected light 12 resulting from the surface reflection is schematically shown with the dotted arrows.

Figure 6:
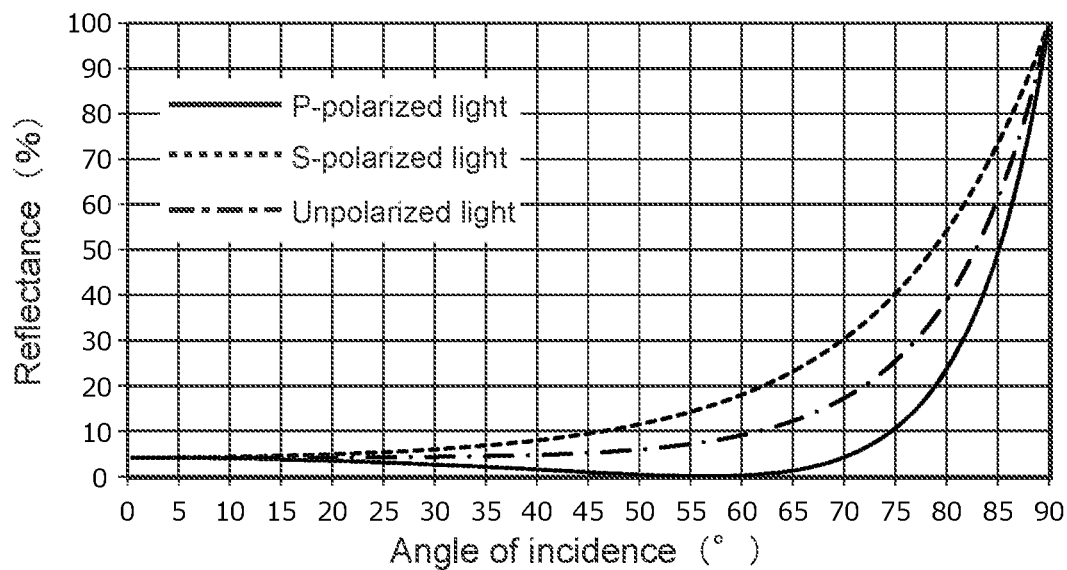
FIG. 6 A graph showing reflectance characteristics on an interface.

FIG. 6 is a graph showing the reflectance characteristics on the interface. FIG. 6 shows the reflectance characteristics on the interface when light enters the interface on which materials having different refractive indices are in contact with each other. The horizontal axis of the graph indicates the angle of incidence on the interface and the vertical axis indicates the reflectance on the interface. The graph shows the reflectance of P-polarized light (solid line), the reflectance of S-polarized light (dotted line), and the reflectance of unpolarized light (dashed line).

The p-polarized light is linearly polarized light polarized in a direction parallel to a plane of incidence of light that enters the interface. Further, the S-polarized light is linearly polarized light polarized in a direction orthogonal to the plane of incidence. Therefore, the P-polarized light and the S-polarized light are linearly polarized light having polarization directions orthogonal to each other. Further, the unpolarized light is polarized light having no particular polarization directions. For example, light obtained by combining the P-polarized light and the S-polarized light is the unpolarized light.

Figure 7:
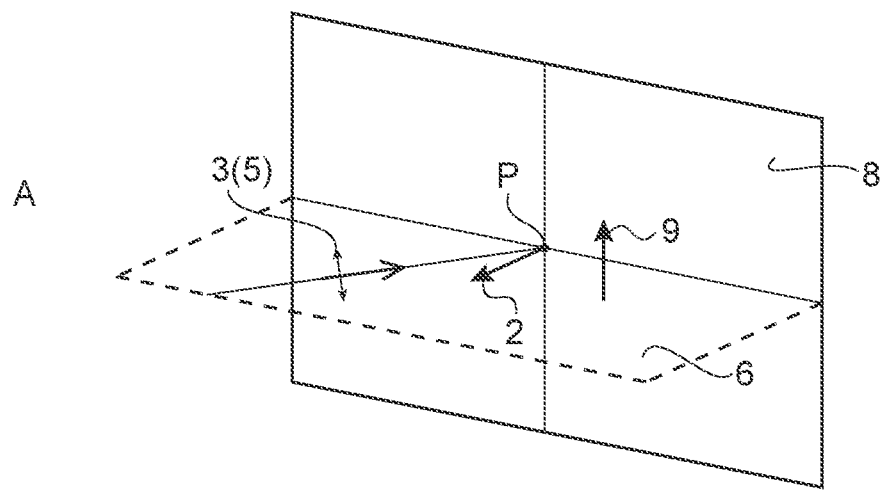
FIG. 7 A schematic diagram for describing a polarization direction of light that enters the interface.
Figure 7:
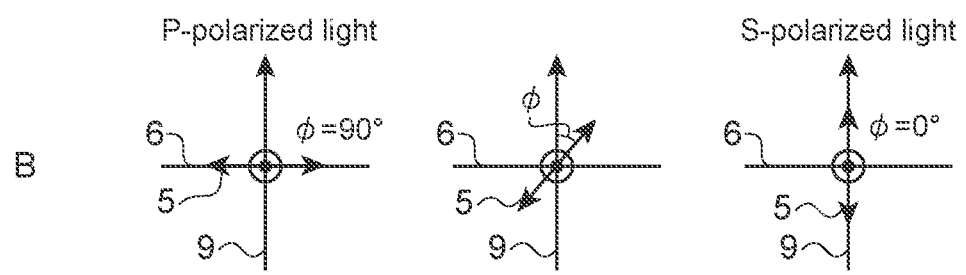

FIG. 7 is a schematic diagram for describing the polarization direction of the light that enters the interface. FIG. 7A is a schematic diagram showing an plane of incidence 6 of light (linearly polarized light 3) that enters the interface 8. FIG. 7B is a schematic diagram showing a relationship between the plane of incidence 6 and the polarization direction 5 of the linearly polarized light 3.

The plane of incidence 6 is, for example, a plane including a direction of incidence of light and the normal direction 2 of the interface 8 at a position (position of incidence P) at which the light enters the interface 8. As shown in FIG. 7A, the light reflected/refracted on the interface travels along this plane of incidence 6. Further, the polarization direction 5 of the light that enters each position of incidence P can be defined by using the plane of incidence 6 as a reference.

In the present disclosure, the orientation of the polarization direction is represented by an angle φ of the polarization direction 5 with respect to a normal direction 9 of the plane of incidence 6. In the center of the FIG. 7B, the angle φ of the polarization direction 5 with respect to the normal direction 9 of the plane of incidence 6 is shown. It should be noted that the vertical direction in the figure corresponds to the normal direction 9 of the plane of incidence 6 and the horizontal direction corresponds to an in-plane direction of the plane of incidence 6. Further, the traveling direction of the light corresponds to a direction perpendicular to the sheet.

On the left and right sides of the FIG. 7B, the polarization directions 5 of the light that becomes the P-polarized light and the S-polarized light are shown. For example, the P-polarized light is polarized light having φ=90° and vibrates along the plane of incidence 6. The S-polarized light is polarized light having φ=0° and vibrates perpendicularly to the plane of incidence 6.

As shown in the graph of FIG. 6, when the angle of incidence is 0°, i.e., when the light enters the interface perpendicularly to the interface, the light is reflected at a substantially constant reflectance irrespective of the polarization state of the light (P-polarized light, S-polarized light, and unpolarized light). As the angle of incidence increases, the reflectance of the P-polarized light decreases to a certain angle of incidence (Brewster's angle) and then increases. On the other hand, the reflectance of the S-polarized light increases without decreasing as the angle of incidence increases.

Further, as shown in FIG. 6, in the range of the angle of incidence from 0° to 90°, the reflectance of the S-polarized light is higher than the reflectance of the P-polarized light. Therefore, it can be also said that when the S-polarized light enters the interface, the surface reflection intensity is higher than that of the P-polarized light. It should be noted that the reflectance of the unpolarized light is approximately a mean of those of the P-polarized light and the S-polarized light. Therefore, also when the unpolarized light enters the interface, the surface reflection intensity is higher than that of P-polarized light by the amount of S-polarized components included in the unpolarized light.

Therefore, in the reflection on the interface, the surface reflection intensity is smallest when the P-polarized light enters the interface. When the surface reflection intensity decreases, the intensity of light passing through the interface relatively increases. Therefore, it can be also said that the transmittance on the interface is increased with the P-polarized light.

It should be noted that linearly polarized light other than the P-polarized light and the S-polarized light includes both P-polarized components and S-polarized light components. The reflectance of such linearly polarized light takes a value depending on the ratio of the P-polarized light and the S-polarized light. Thus, the surface reflection or the like occurs on the interface at a reflectance depending on the angle of the polarization direction with respect to the plane of incidence (the ratio of the P-polarized light and the S-polarized light).

In the image display apparatus 100, as shown in FIG. 5, the plane including a direction of incidence of the image light 21 with respect to the first surface 33 and a normal direction of the first surface 33 at the position of incidence P of the image light 21 is the plane of incidence 6. Therefore, the plane of incidence 6 of the image light 21 entering the screen 30 (first surface 33) along the optical path shown in FIG. 5 corresponds to the XY plane. It should be noted that the screen 30 has a rotationally symmetric shape about the optical axis 1. Therefore, for example, an arbitrary plane including the optical axis 1 corresponds to the plane of incidence 6 of the image light 21 entering the screen 30 along the plane.

The polarization direction 5 of the image light 21 with respect to the normal direction (sheet direction) of the plane of incidence 6 is set by the polarization control unit 50. As described with reference to FIG. 3, in the polarization control unit 50 (axially symmetric wave plate 51), the distribution of the polarization directions 5 of the image light 21 is converted into a distribution symmetric with respect to the optical axis 1. For example, in FIG. 3, when the polarization direction 5 (linearly polarized light 3) of the image light 21 at a certain position intersects at a substantially constant angle with the radial direction (plane of incidence 6) at the position, the polarization direction 5 and the radial direction intersect with each other at the same angle at other positions.

Thus, in the polarization control unit 50, the polarization direction of the image light 21 is controlled such that the angle of the polarization direction 5 of the image light 21 with respect to the normal direction of the plane of incidence 6 is substantially constant. It should be noted that in the present disclosure, the substantially constant angle (angle between the plane of incidence 6 and the image light 5) includes allowable angles in an angle range in which image display can be properly performed. This angle range is set as appropriate such that image display can be performed at a desired luminance, for example.

Thus, since the angle of the polarization direction 5 with respect to the plane of incidence 6 is substantially constant, for example, it is possible to cause the image light including the P-polarized light and the S-polarized light in a similar ratio to enter the 360° circumference of the screen 30. As a result, it is possible to sufficiently reduce circumferential luminance unevenness and the like.

In this embodiment, the polarization control unit 50 radially polarizes the image light 21. Therefore, as shown in FIG. 3, the angle of intersection between the polarization direction 5 of the image light 21 emitted from the polarization control unit 50 and the radial direction is 0°, and the polarization direction 5 and the radial direction are parallel to each other. Thus, the polarization control unit 50 controls the polarization direction 5 of the image light 21 such that the plane of incidence 6 and the polarization direction 5 of the image light 21 are parallel to each other.

As described above, when the polarization direction 5 of the image light 21 is parallel to the plane of incidence 6, the image light 21 is the P-polarized light with respect to the first surface 33. Therefore, it can be also said that the polarization control unit 50 controls the polarization state of the image light 21 such that the image light 21 entering the screen 30 is the P-polarized light with respect to the screen 30.

Figure 8:
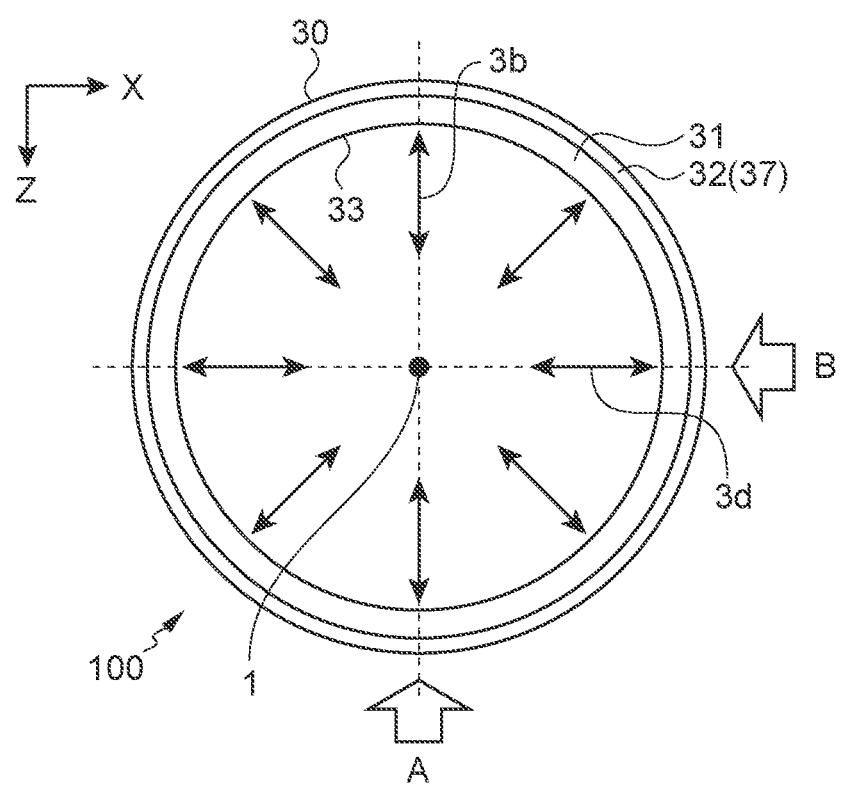
FIG. 8 A schematic diagram showing a distribution of polarization directions of image light that enters a screen.

FIG. 8 is a schematic diagram showing the distribution of the polarization directions of the image light 21 entering the screen 30. FIG. 8 shows a schematic cross-sectional view as the screen 30 cut in the direction perpendicular to the optical axis 1 (direction parallel to the XZ plane) is viewed from above the image display apparatus 100.

As the screen 30 is viewed from above, the distribution of the polarization directions 5 of the image light 21 entering the first surface 33 is a distribution rotationally symmetric with respect to the optical axis 1. Further, the image light 21 entering the respective positions of the first surface 33 is P-polarized light parallel to each plane of incidence 6 (plane including the optical axis 1).

Figure 9:
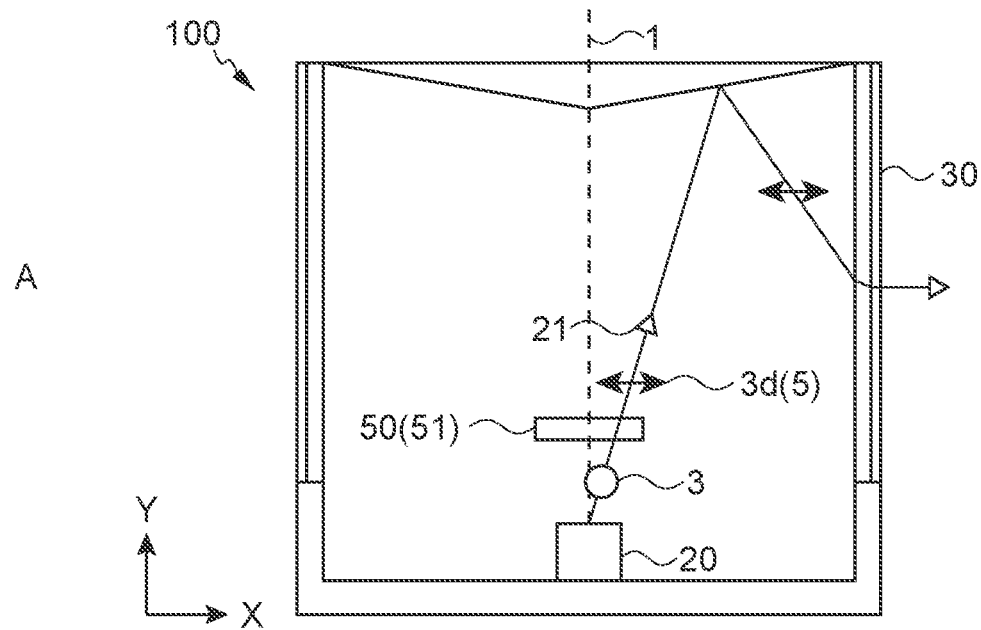
FIG. 9 A schematic diagram showing an example of an optical path of the image light that enters the screen shown in FIG. 8.
Figure 9:
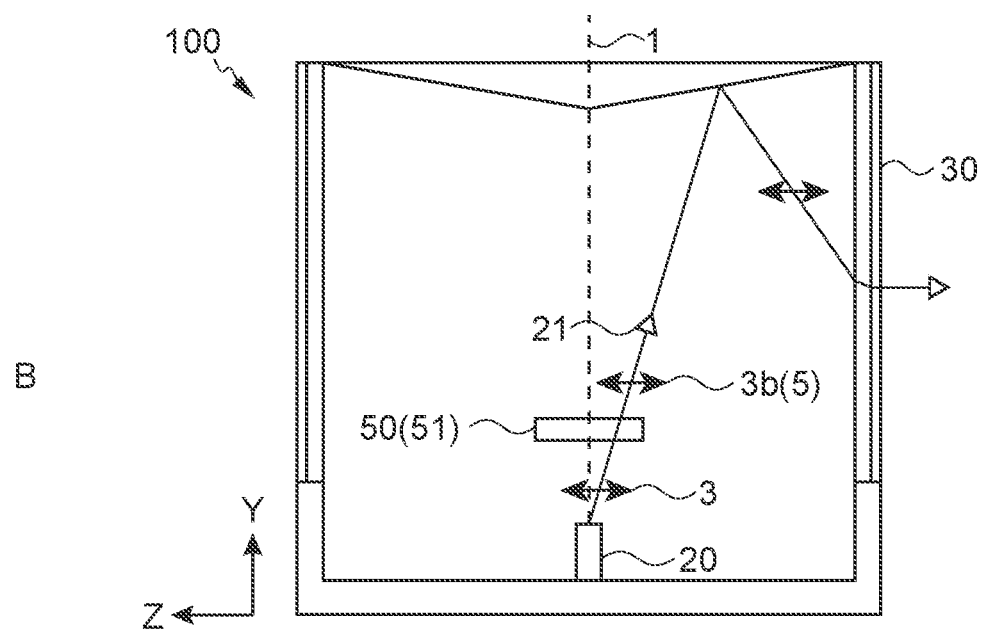

FIG. 9 is a schematic diagram showing an example of an optical path of the image light 21 entering the screen 30 shown in FIG. 8. FIG. 9A is a cross-sectional view of the image display apparatus 100 cut along the optical axis in parallel to the XY plane. In FIG. 9A, an example of an optical path in the apparatus as viewed from the viewpoint A shown in FIG. 8 (the front side of the image display apparatus 100) is schematically shown. Further, the FIG. 9B is a cross-sectional view of the image display apparatus cut along the optical axis in parallel to the YZ plane. In FIG. 9B, an example of an optical path in the apparatus as viewed from the viewpoint B shown in FIG. 8 (right side of the image display apparatus 100) is schematically shown.

For example, the image light 21 emitted from the emitter 20 is linearly polarized light 3 polarized in a direction parallel to the Z axis direction (perpendicular to the XY plane). Therefore, as the image display apparatus 100 is viewed from the front side as shown in FIG. 9A, the image light 21 emitted from the emitter 20 is linearly polarized light 3 perpendicular to the sheet (XY plane).

Light of this image light 21, which is emitted to the right side in the figure across the optical axis 1 (to the right side of the image display apparatus) enters a position at which the optical axis 53 of the axially symmetric wave plate 51 is set to 135° (see FIG. 2). As a result, the image light 21 polarized in the Z axis direction is rotated by 270° (=135°×2) and is emitted as the linearly polarized light 3d parallel to the XY plane. Thus, on the path parallel to the XY plane, the image light 21 polarized in parallel to the XY plane, i.e., P-polarized light enters the first surface 33.

Further, as the image display apparatus 100 is viewed from the left side as shown in FIG. 9B, the image light 21 emitted from the emitter 20 is linearly polarized light 3 parallel to the left and right directions (Z axis direction) in the figure. It corresponds to as a case where the polarization direction 5 shown in FIG. 9A is viewed from a position shifted by 90° around the optical axis 1.

Light of this image light 21, which is emitted to the right side in the figure across the optical axis 1 (to the back side of the image display apparatus 100) enters a position at which the optical axis 53 of the axially symmetric wave plate 51 is set to 0° (see FIG. 2). As a result, the image light 21 polarized in the Z axis direction is emitted as the linearly polarized light 3b parallel to the YZ plane without being rotated. Thus, on the path parallel to the YZ plane, the image light 21 polarized in parallel to the YZ plane, i.e., P-polarized light enters the first surface 33.

Further, the image light 21 entering other positions is also converted to be the P-polarized light with respect to the screen 30 by the polarization control unit 50 (axially symmetric wave plate 51). It should be noted that in the present disclosure, the P-polarized light includes light which is substantially the P-polarized light and the like. That is, the image light that enters the screen may include the S-polarized light within a range in which image display can be properly performed, for example. In another aspect, it can also be said that the image light that becomes the P-polarized light with respect to the screen is light having P-polarized components of the polarized components with respect to the screen as main polarized components.

Thus, the polarization control unit 50 controls the polarization state of the image light 21 entering the screen 30 in accordance with the shape of the screen 30. Accordingly, as shown in FIG. 8, it is possible to cause the P-polarized light to enter the 360° circumference of the screen 30.

As a result, it is possible to significantly reduce the surface reflection on the interface (first surface 33) of the screen 30. That is, surface-reflected components decreases, and passing components that pass through the first surface 33 increases. As a result, the intensity of the image light 21 emitted outward from the screen 30 increases, and it is possible to significantly enhance the luminance of the image displayed on the screen 30.

Further, since it is possible to cause the P-polarized light to enter any position on the screen 30, it is possible to sufficiently reduce circumferential luminance unevenness and the like. Accordingly, it is possible to avoid the problem in that the brightness of a displayed image varies depending on each position. As a result, it is possible to achieve high-quality image display on the all-around screen 30.

Further, in this embodiment, the angle of incidence θ of the image light 21 is controlled by the reflection mirror 40 to be substantially constant. Thus, it is possible to cause the image light 21 to enter an area from the upper side to the lower side of the screen 30 at a substantially similar angle (see FIG. 1B). Accordingly, it is possible to sufficiently reduce luminance unevenness and the like in the upper and lower directions of the screen 30.

In this embodiment, the angle of incidence θ of the image light 21 with respect to the screen 30 is controlled at 45° or more and 75° or less. That is, the reflection mirror 40 is configured to cause the image light 21 to enter the screen at the angle of incidence θ set in the range of 45° or more and 75° or less.

As shown in the graph of FIG. 6, when the angle of incidence θ is in the range of 45° or more, the reflectance can be sufficiently reduced with P-polarized light, for example, as compared to a case of making the S-polarized light or the unpolarized light incident. For example, when the angle of incidence θ is 45°, it is possible to keep the reflectance to be 1% or less. On the other hand, with θ=45°, the reflectance of the S-polarized light is about 10% and the reflectance of the unpolarized light is about 5%, and the differences from the P-polarized light are thus remarkable. The luminance can be thus effectively improved by setting the P-polarized light to the angle of incidence θ of 45° or more.

Further, for example, when the angle of incidence θ is in the range of 75° or less, it is possible to cause the image light 21 to enter the screen 30 at a sufficiently wide angle with the P-polarized light, for example, while reducing an increase in reflectance. For example, by performing a wide-angle image projection with a large angle of incidence θ, the area in which image display can be performed can be widened in the upper and lower directions. Accordingly, for example, it is possible to display an image over the entire area from the upper end to the lower end of the screen 30, and it is possible to fully exhibit the characteristics of the all-around screen.

It should be noted that the range of the angle of incidence θ and the method of setting the angle of incidence are not limited. For example, the angle of incidence θ may be controlled in the range of 55° or more and 75° or less. For example, when the angle of incidence θ is 55°, the reflectance of the P-polarized light is about 0%. In this case, the P-polarized light is emitted outward from the screen 30 with little surface reflection. Therefore, by setting the angle of incidence θ in the range of 55° or more and 75° or less, it is possible to achieve image display at a high luminance in a wide display range.

Further, for example, the angle of incidence θ may be controlled in the range of 40° or more and 80° or less. Accordingly, it is possible to conform to screens 30 in various shapes and to extend the variation of the apparatus, for example.

Further, the angle of incidence θ may be set in accordance with the characteristics of the transmissive HOE 37 that is the diffractive optical element. Further, for example, the angle of incidence θ may be set in accordance with the material or the like of the cylindrical base member 31. Alternatively, the angle of incidence θ may be set such that a desired luminance can be achieved on the basis of the value or the like of the reflectance to be described later. Additionally, any method of setting the angle of incidence θ may be used.

Referring back to FIG. 5, the image light 21 passing through the first surface 33 inside the screen 30 is refracted by the cylindrical base member 31 and travels inside the cylindrical base member 31. The refracted image light 21 passes through the second surface 34 of the cylindrical base member 31 (through the third surface of the optical film 32). It should be noted that the refractive indices of the cylindrical base member 31 and the optical film 32 (transmissive HOE 37) are set to be similar to each other by refractive index matching. Thus, reflection and the like hardly occurs on the interface on which the second surface 34 and the third surface 35 are in contact with each other.

The image light 21 entering from the third surface 35 is diffracted by the interference fringes recorded on the transmissive HOE 37. For example, interference fringes for emitting the diffused light 11 diffused at a predetermined angle of diffusion in a predetermined emission direction are recorded on the transmissive HOE 37. The image light 21 diffracted by those interference fringes is emitted from the fourth surface 36 as the diffused light 11. Accordingly, an image constituted by the image light 21 is displayed on the screen 30.

It should be noted that when it is emitted from the fourth surface 36, the reflection depending on a difference in refractive index between the transmissive HOE 37 and the air (interface refractive index difference) occurs in some cases. Even in those cases, since the image light 21 is the P-polarized light, it is possible to sufficiently reduce the intensity of the reflected light reflected on the fourth surface 36. That is, by converting the image light 21 into the P-polarized light, reflection at the time of emission and the like are reduced, and it is possible to achieve image display at a high luminance.

As described above, in the image display apparatus 100 according to this embodiment, the image light 21 emitted from the emitter 20 along the optical axis 1 enters the reflection mirror 40 disposed to be opposite to the emitter 20. The reflection mirror 40 causes the emitted image light 21 to enter the screen 30 disposed in at least a part of the area around the optical axis 1. Further, the polarization control unit 50 controls the polarization state of the image light 21 entering the screen 30 in accordance with the shape of the screen 30. Accordingly, it is possible to achieve high-quality image display on an all-around screen or the like.

For displaying an image on the all-around screen or the like, one of conceivable methods is directly projecting light emitted from the projector without adjusting the polarization direction of the light, for example. In such a case, there is a possibility that a problem of lowering of the luminance, luminance unevenness of the image, and the like may arise due to surface reflection on the all-around screen or the like, and it may be difficult to properly display the image.

Figure 10:
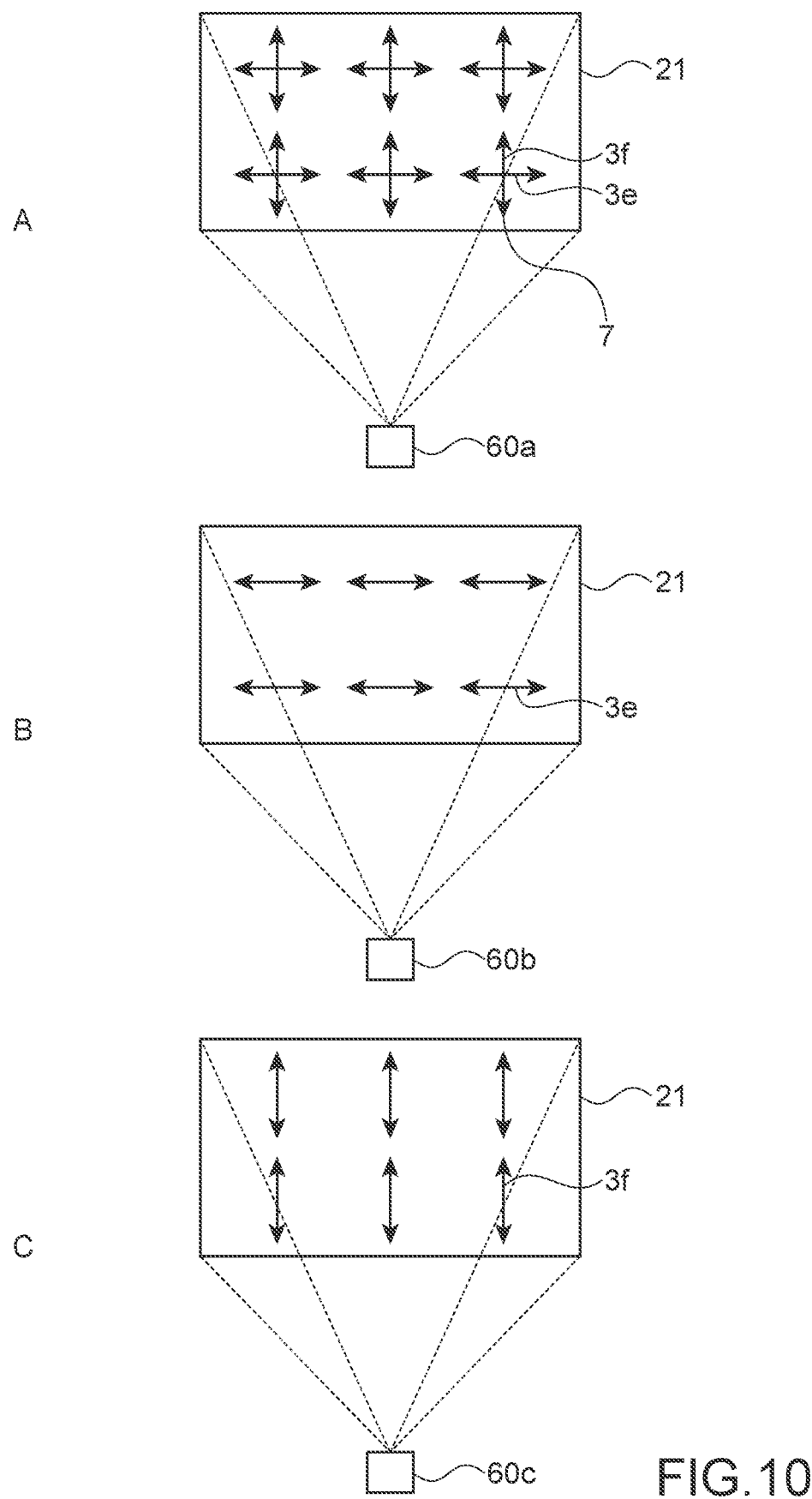
FIG. 10 A schematic diagram showing an example of image light emitted from a projector shown as a comparative example.
Figure 11:
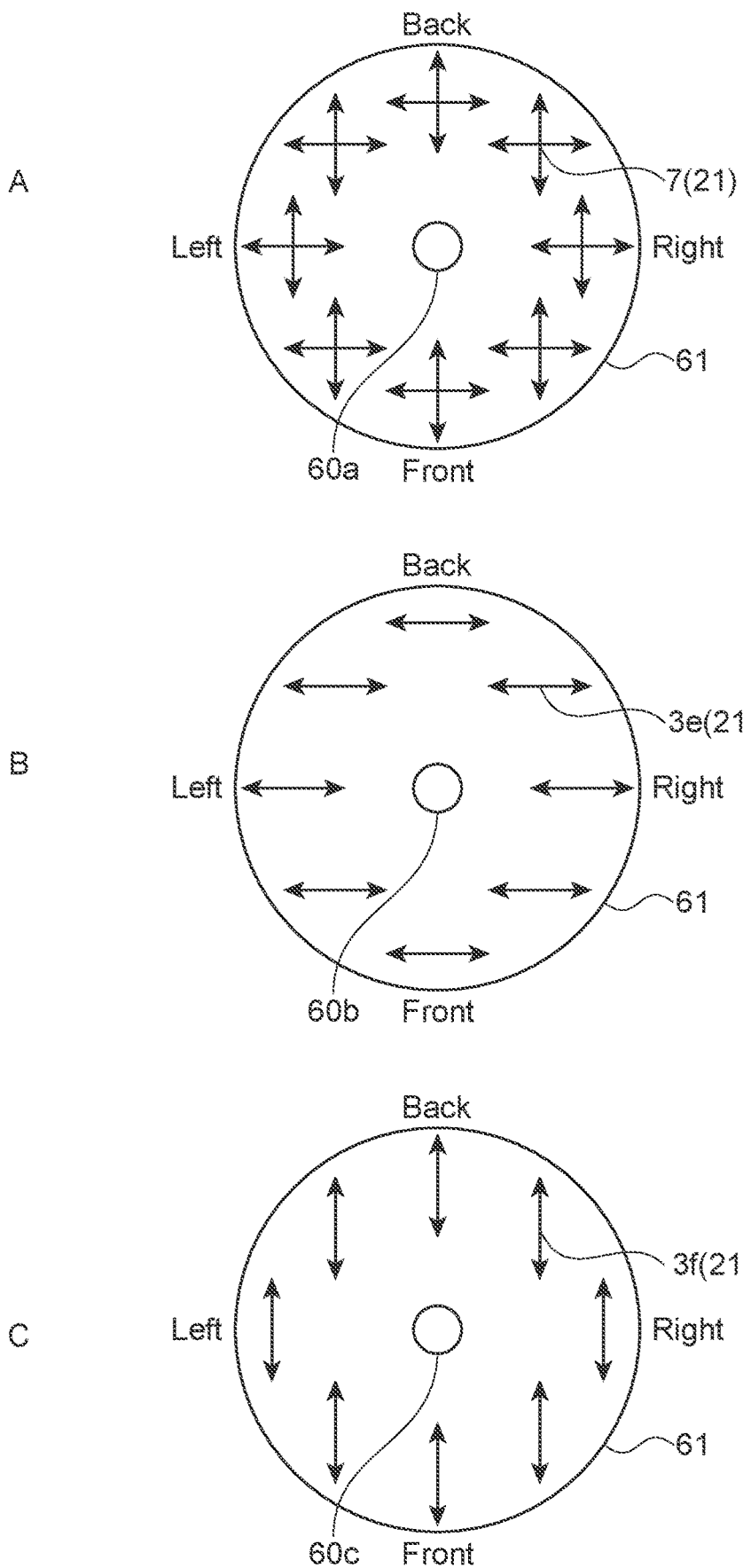
FIG. 11 A schematic diagram showing an example of a polarization state of image light that enters a cylindrical screen shown as a comparative example.

FIG. 10 is a schematic diagram showing an example of image light 21 emitted from a projector shown as a comparative example. FIG. 11 is a schematic diagram showing an example of a polarization state of the image light 21 entering a cylindrical screen shown in as the comparative example.

In FIG. 10A, a projector 60a emits image light 21 that is unpolarized light 7. The unpolarized light 7 is light having no particular polarization directions and obtained by combining light rays polarized in various directions. In FIG. 10A, unpolarized light obtained by combining linearly polarized light 3e and 3f polarized in the vertical and horizontal directions orthogonal to each other is schematically shown.

In FIG. 11A, the state of polarization (distribution of polarization directions) when the image light 21 that is the unpolarized light 7 shown in FIG. 10A is projected on a cylindrical screen 61 is schematically shown. The image light 21 that is the unpolarized light emitted from the projector 60a is radially reflected toward the cylindrical screen 61 by a reflection mirror or the like. Thus, as shown in FIG. 11A, the image light 21 that is the unpolarized light 7 enters each position of incidence on the cylindrical screen 61.

The image light 21 that is the unpolarized light 7 is light including P-polarized light components and S-polarized components in a similar ratio at each position of incidence on the cylindrical screen 61. Therefore, at each position of incidence, the S-polarized components are more reflected. As a result, the surface reflection intensity increases and on the contrary, the display luminance of the image lowers. Thus, when performing image display or the like on the cylindrical screen 61 by using the image light 21 that is the unpolarized light 7, there is a possibility that it leads to lowering of the luminance of the image due to the surface reflection of the S-polarized components.

In FIG. 10B, a projector 60b emits linearly polarized light 3e of the image light 21 polarized in the left and right directions (horizontal direction) in the figure. In FIG. 11B, a polarization direction distribution when the image light 21 that is the linearly polarized light 3e in the horizontal direction shown in FIG. 10B is projected on the cylindrical screen 61 is schematically shown.

When the linearly polarized light 3e in left and right directions is used as shown in FIG. 11B, the image light 21 enters as the P-polarized light on the left and right sides of the cylindrical screen 61 (on the left and right sides in the figure). On the other hand, the image light 21 enters as the S-polarized light the front and back sides of the cylindrical screen 61 (on the side and the right side in the figure).

Thus, in FIG. 11B, the surface reflection intensity is low at the left and right of the cylindrical screen 61 and the surface reflection intensity is high at the front and back of the cylindrical screen 61. As a result, the luminance of the image displayed on the front and back sides lowers as compared to the luminance of the image displayed on the left and right sides of the cylindrical screen 61. Therefore, an image having uneven luminance may be displayed on the cylindrical screen 61 and the quality of the image may lower.

Further, in FIG. 10C, a projector 60c emits image light 21 that is linearly polarized light 3f polarized in the upper and lower directions (vertical direction) in the figure. In FIG. 11C, a distribution of polarization directions when the image light 21 that is the linearly polarized light 3f in the vertical direction shown in FIG. 10C is projected on the cylindrical screen 61 is schematically shown.

When the linearly polarized light 3f in the vertical direction is used as shown in FIG. 11C, the S-polarized light enters the left and right of the cylindrical screen 61 and the P-polarized light enters the front and back of the cylindrical screen 61. As a result, the luminance of the image displayed on the left and right lowers as compared to the luminance of the image displayed on the front and back of the cylindrical screen 61, and the luminance becomes uneven over the entire circumference.

Thus, when the image light 21 that is the linearly polarized light 3 is projected as it is on the cylindrical screen 61, the ratio of the P-polarized components and the S-polarized components of the image light 21 on the cylindrical screen 61 varies depending on each position of incidence. As a result, the distribution of luminance is formed for each display position, and it may be difficult to properly image display.

In this embodiment, the polarization control unit 50 controls the polarization state of the image light 21 emitted from the emitter 20 such that the P-polarized light enters the cylindrical screen 30 over the entire circumference. Thus, it is capable to sufficiently avoid lowering of the luminance when the image light 21 that is the unpolarized light 7 is made incident (see FIG. 11A), the occurrence of luminance unevenness when the image light 21 that is the linearly polarized light 3 is made incident (see FIGS. 11B and 11C), and the like.

For example, by causing the P-polarized light to enter the entire circumference as shown in FIG. 6, it is possible to enhance the luminance at any angle of incidence θ as compared to a case of causing the unpolarized light 7 to enter it. That is, it is possible to avoid surface reflection or the like due to the S-polarized components included in the unpolarized light 7 and to efficiently display the image light 21. By increasing the luminance in this way, it is possible to achieve a visual expression giving a sufficient floating sense even in a bright environment.

As an example, the reflectance at the time of incidence of the unpolarized light is 7% when the angle of incidence θ is 55° for example, while the reflectance can be substantially 0% when the P-polarized light is radially polarized and made incident. In this case, luminance improvement by about 7% converted in terms of the transmittance can be achieved. Further, the reflectance at the time of incidence of the unpolarized light when the angle of incidence θ is 75° is 26% while the reflectance at the time of incidence of P-polarized light is about 11%. In this case, luminance improvement by about 20% converted in terms of the transmittance can be achieved.

Further, for example, as shown in FIGS. 11B and 11C, in the configuration in which the linearly polarized light 3 is used as it is, luminance unevenness at the luminance ratio depending on a difference in reflectance (transmittance) of the P-polarized light and the S-polarized light occurs. For example, when the angle of incidence θ is 55°, the reflectance of the P-polarized light is about 0% and the reflectance of the S-polarized light is about 14%. In this case, the luminance ratio converted in terms of the transmittance is about 14%. Furthermore, for example, when the angle of incidence θ is 75°, the reflectance of P-polarized light is about 11%, the reflectance of S-polarized light is about 40%. In this case, the luminance ratio converted in terms of the transmittance is about 48%. Thus, the luminance unevenness (luminance ratio) increases as the angle of incidence θ becomes larger and the angle becomes wider.

In this embodiment, by radially polarizing the image light 21 by using the polarization control unit 50, it is possible to cause the P-polarized light to enter the entire circumference of the screen 30. Accordingly, it is possible to avoid a situation where the luminance varies depending on each position of the screen 30. For example, even with a wide-angle configuration in which the angle of incidence θ is larger, it is possible to achieve proper image display without causing luminance unevenness and the like. As a result, it is possible to achieve high-quality image display on an all-around screen or the like.

Further, in this embodiment, the angle of incidence θ of the image light 21 entering the screen 30 is controlled to be substantially constant. Accordingly, it is possible to cause the P-polarized light to enter any position on the screen 30 at a similar angle of incidence θ. As a result, it is possible to reduce luminance unevenness and the like in the upper and lower directions of the screen 30, and it is possible to display a high-quality all-around image or the like.

OTHER EMBODIMENTS

The present technology is not limited to the above-mentioned embodiment and various other embodiments can be made.

In the above-mentioned embodiment, the emitter 20 that emits the linearly polarized light 3 as the image light 21 is used. The present technology is not limited thereto, and it is possible to achieve radial polarization of the image light 21 or the like by configuring the polarization control unit as appropriate even in a case where an emitter or the like that emits the unpolarized light as the image light is used, for example.

Figure 12:
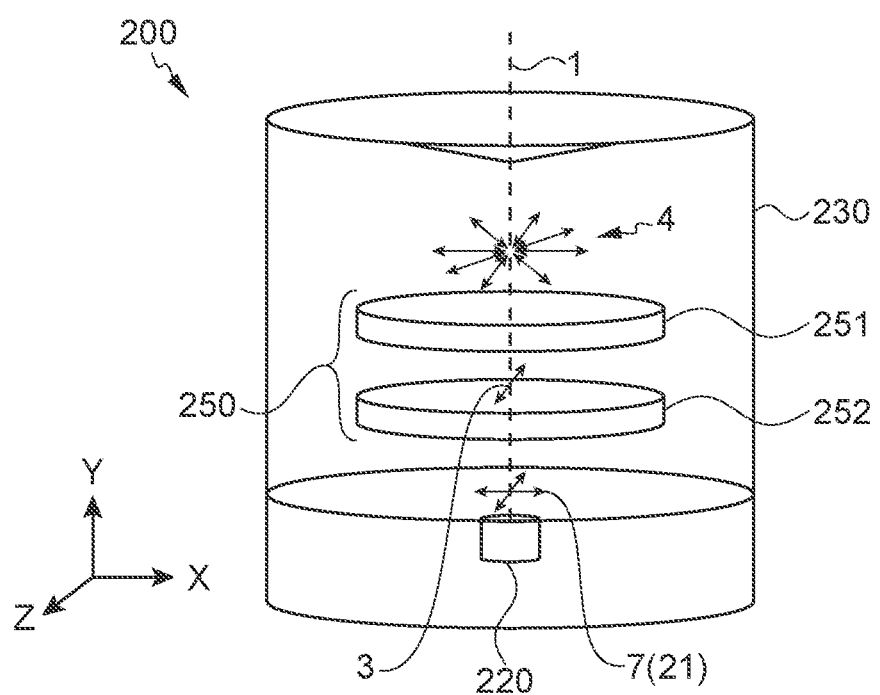
FIG. 12 A schematic diagram showing another example of polarization conversion by the polarization control unit.

FIG. 12 is a schematic diagram showing another example of polarization conversion by the polarization control unit. In FIG. 12, an emitter 220 and a polarization control unit 250 provided in the image display apparatus 200 are schematically shown. The emitter 220 is configured to emit the image light 21 that is the unpolarized light 7 along the optical axis 1.

The polarization control unit 250 includes an axially symmetric wave plate 251 and a polarizing plate 252. The axially symmetric wave plate 251 has a disc shape centered on the center axis and is disposed such that the optical axis 1 coincides with the center axis. The axially symmetric wave plate 251 is configured similarly to the axially symmetric wave plate 51 described above with reference to FIG. 2 and the like, for example. It should be noted that a reference direction that is a reference for rotation (e.g., Z axis direction in FIG. 2) is set in the axially symmetric wave plate 251.

The polarizing plate 252 is disposed to be opposite to the emitter 220 between the axially symmetric wave plate 251 and the emitter 220. The polarizing plate 252 emits linearly polarized light 3 by aligning the polarization directions of the incident light. For example, the light passing through the polarizing plate 252 is converted into linearly polarized light 3 polarized in an optical axis direction of the polarizing plate 252. It should be noted that the polarizing plate 252 is disposed such that the optical axis direction is parallel to the above-mentioned reference direction of the axially symmetric wave plate 251. For example, a wire grid polarizer, a polarizing film, or the like is used as the polarizing plate 252. The specific configuration of the polarizing plate 252 is not limited.

As shown in FIG. 12, the image light 21 that is the unpolarized light 7 emitted from the emitter 220 enters the polarizing plate 252. The image light 21 entering the polarizing plate 252 is converted into the linearly polarized light 3 and emitted toward the axially symmetric wave plate 251. Thus, the linearly polarized light 3 polarized in a predetermined direction enters each point on the axially symmetric wave plate 251.

The axially symmetric wave plate 251 rotates each of the polarization directions of the linearly polarized light 3 entering the respective points. The polarization direction of the linearly polarized light 3 (the optical axis direction of the polarizing plate 252) coincides with the reference direction of the axially symmetric wave plate 251. Therefore, the image light 21 that is the linearly polarized light 3 is converted into radially polarized light 4 by the axially symmetric wave plate 251. Thus, it is possible to cause the image light 21 that is the P-polarized light to enter a cylindrical screen 230. As a result, it is possible to achieve high-quality image display on an all-around screen or the like.

In the above, the polarization control unit is disposed outside the emitter and the polarization direction of the image light is controlled. For example, the polarization control unit may be disposed inside the emitter.

For example, an axially symmetric wave plate, a polarizing plate, or the like that functions as the polarization control unit is disposed as appropriate on the optical path of the image light combined by using a combining prism or the like in the emitter. For example, in a case where the combined image light is linearly polarized light, the axially symmetric wave plate is used. Further, for example, in a case where the combined image light is unpolarized light, the polarizing plate and the axially symmetric wave plate are used. The position at which the polarization control unit is provided and the like are not limited, and for example, the polarization control unit may be disposed as appropriate at a position at which the polarization state of the image light can be properly controlled.

Further, the polarization control unit can also be incorporated in a case where a scanning type projector or the like that performs image display by scanning beam light (image light) such as a laser beam is used as the emitter. In this case, an element (liquid crystal converter or the like) that controls the polarization direction of the beam light in a time division manner may be used as the polarization control unit such that the beam light that enters each position on the screen is P-polarized light, for example. For example, such a configuration may be used.

The emitter in which the polarization control unit is incorporated as described above emits image light having the polarization state controlled along the optical axis. For example, in a case where the cylindrical screen is used, radially polarized image light is emitted directly from the emitter. By integrating the emitter and the polarization control unit, it is possible to accurately control the polarization direction and the like of the image light. Further, it is possible to reduce the number of components, it is possible to simplify the configuration of the image display apparatus.

A light-emitting element such as a laser diode (LD) emits a laser beam in a predetermined polarization state. For example, in the emitter, an RGB laser light source (light-emitting element) in which polarized light is aligned may be used. For example, by configuring each light-emitting element as appropriate, it is possible to emit image light having the polarization state controlled. For example, it is possible to emit light radially polarized for each region by arranging a plurality of LDs concentrically and aligning the polarization directions of the respective LDs in the radial direction. In this case, each light-emitting element functions as the polarization control unit that controls the polarization state of the image light. Such a configuration may be employed, for example.

In the above, the reflection mirror including the reflection surface constituted by the parabolic surface is used. The shape and the like of the reflection surface are not limited, and for example, any reflection surface capable of reflecting the image light in accordance with the shape of the screen or the like may be used. For example, the reflection surface may be configured as an aspherical surface different from the parabolic surface (freeform surface or the like). The freeform surface is configured to make the angle of incidence θ of the image light with respect to the screen substantially constant, for example. Such a surface can be designed on the basis of optical path simulation or the like, for example.

Further, the present technology is not limited to the case of making the angle of incidence θ substantially constant, the reflection surface may reflect the image light such that angles of incidence θ are distributed in a predetermined angle range. In this case, the image light enters at different angles of incidence θ in the upper and lower directions of the screen, for example. Also in such a case, by reflecting the radially polarized image light or the like, it is possible to cause the image light that is the P-polarized light to enter the screen, and it is possible to sufficiently reduce lowering of the luminance, circumferential luminance unevenness and the like.

Alternatively, an optical element or the like that refracts the image light may be used to cause the image light to enter the screen instead of the reflection mirror that reflects the image light. For example, by using a transmissive optical element such as a Fresnel lens, it is possible to control the traveling direction such that the image light enters the screen. Also in this case, by controlling the polarization direction of the image light as appropriate, it is possible to cause the image light that is the P-polarized light to enter the screen.

In the above-mentioned embodiment, the cylindrical screen is used. The present technology can be applied to a screen having an arbitrary shape disposed around the optical axis, for example.

For example, a screen having a semi-cylindrical shape centered on the optical axis or a screen having an arcuate cross-section may be configured. Alternatively, a screen having an elliptical cross-section or hyperbolic cross-section may be configured other than the circle-based shapes. Further, a prismatic column-shaped screen having a triangular or square cross-section, for example, may be configured. Also in such a case, by configuring the polarization control unit in accordance with the shape of the screen as appropriate, it is possible to cause the image light that is the P-polarized light to enter respective points on the screen.

In the above, the transmissive screen that transmits the image light using the transmissive HOE is used. For example, a reflective HOE may be used as the screen. In the reflective HOE, light entering from a certain surface is diffracted by the interference fringes recorded on the hologram and is emitted from the same surface as the surface that the light has entered. That is, the reflective HOE is an element that reflects light by diffraction. In this case, the screen is a reflective screen that reflects the image light.

For example, it is possible to configure a semi-cylindrical screen or the like by using the reflective HOE. In this case, the image light that enters the screen is diffracted inside the reflective HOE and the image light is emitted from the surface that the image light has entered. Also in such a case, by causing the image light that is the P-polarized light to enter the screen, it is possible to reduce surface reflection on the interface between the screen and the air and to increase the intensity of the image light entering the reflective HOE. Thus, it is possible to enhance the luminance of the image displayed on the screen and to reduce luminance unevenness and the like.

Further, in the above-mentioned embodiment, the polarization state has been described in the configuration of the P-polarized light incidence (radially polarized light incidence), S-polarized light incidence (azimuthally polarized light incidence) may be employed. In the case of the S-polarized light incidence, a luminance unevenness reduction effect over the entire circumference is provided as in the P-polarized light incidence. In addition, the reflectance in the outermost surface (surface from which diffused light is emitted) of the cylinder increases with the S-polarized light as compared to P-polarized light, and thus the amount of transmitting light of incident light, which is not diffused and transmits, decreases, and an effect that image noise projected on a table or the like can be reduced is provided. Further, by applying an anti-reflection film such as a Moth-eye film on the innermost surface of the cylinder, the reflectance is greatly reduced even with the S-polarized light incidence, and it is possible to ensure brightness similar to that in the P-polarized light incidence.

At least two of the features according to the present technology described above may be combined. In other words, various features described in the respective embodiments may be arbitrarily combined across the embodiments. Further, the various effects described above are merely illustrative, not limitative, and other effects may be provided.

It should be noted that the present technology can also take the following configurations.

(1) An image display apparatus, including:
an emitter that emits image light along a predetermined axis;
an irradiation target object that is disposed in at least a part of an area around the predetermined axis;

an optical unit that is disposed to be opposite to the emitter by using the predetermined axis as a reference and causes the emitted image light to enter the irradiation target object; and a polarization control unit that controls a polarization state of the image light that enters the irradiation target object in accordance with a shape of the irradiation target object.

(2) The image display apparatus according to (1), in which the polarization control unit controls a polarization direction of the image light as the polarization state of the image light.

(3) The image display apparatus according to (2), in which the irradiation target object includes an interface that the image light enters, and the polarization control unit controls the polarization direction of the image light such that an angle of the polarization direction of the image light with respect to a normal direction of a plane of incidence is substantially constant, the plane of incidence including a direction of incidence of the image light with respect to the interface and a normal direction of the interface at a position of incidence of the image light.

(4) The image display apparatus according to (3), in which the polarization control unit controls the polarization direction of the image light such that the plane of incidence and the polarization direction of the image light are parallel to each other.

(5) The image display apparatus according to any one of (1) to (4), in which the shape of the irradiation target object includes a rotationally symmetric shape having the predetermined axis as a substantially center axis, and the polarization control unit controls the polarization state such that a distribution of polarization directions of the image light are symmetric with respect to the predetermined axis.

(6) The image display apparatus according to (5), in which the polarization control unit converts the image light into radially polarized light.

(7) The image display apparatus according to any one of (1) to (6), in which the irradiation target object is disposed in an area all around the predetermined axis.

(8) The image display apparatus according to any one of (1) to (7), in which the irradiation target object is constituted by a cylindrical shape having the predetermined axis as a substantially center axis.

(9) The image display apparatus according to any one of (1) to (8), in which the optical unit controls an angle of incidence of the emitted image light with respect to the irradiation target object.

(10) The image display apparatus according to (9), in which the optical unit controls the angle of incidence of the image light with respect to the irradiation target object to be 45° or more and 75° or less.

(11) The image display apparatus according to (9) or (10), in which the optical unit makes the angle of incidence of the image light with respect to the irradiation target object substantially constant.

(12) The image display apparatus according to any one of (9) to (11), in which the optical unit includes a reflection surface that reflects the image light emitted from the emitter to the irradiation target object.

(13) The image display apparatus according to any one of (1) to (12), in which the polarization control unit includes a rotator that rotates each of polarization directions of light rays that enter respective points in accordance with the shape of the irradiation target object.

(14) The image display apparatus according to (13), in which the polarization control unit includes a polarization plate that aligns the polarization directions of the entering light rays and emits linearly polarized light rays, and the rotator rotates each of the polarization directions of the linearly polarized light rays that enter respective points.

(15) The image display apparatus according to any one of (1) to (14), in which the polarization control unit is disposed to be opposite to the emitter by using the predetermined axis as a reference.

(16) The image display apparatus according to any one of (1) to (14), in which the polarization control unit is disposed inside the emitter, and the emitter emits the image light having the polarization state controlled along the predetermined axis.

(17) The image display apparatus according to (16), in which the polarization control unit includes a light-emitting element that emits the image light having the polarization state controlled.

(18) The image display apparatus according to any one of (1) to (17), in which the irradiation target object includes a screen using a diffractive optical element.

(19) The image display apparatus according to any one of (1) to (18), in which the irradiation target object includes at least one of a transmissive screen that transmits the image light or a reflective screen that reflects the image light.

(20) The image display apparatus according to any one of (1) to (19), in which the irradiation target object is light-transmissive.

REFERENCE SIGNS LIST 1 optical axis
2 normal direction
4 radially polarized light
5 polarization direction
6 plane of incidence
20, 220 emitter
21 image light
30, 230 screen
31 cylindrical base member
32 optical film
33 first surface
37 transmissive HOE
40 reflection mirror
41 reflection surface
50, 250 polarization control unit
51, 251 axially symmetric wave plate
252 polarization plate
100, 200 image display apparatus

The invention claimed is:
1. An image display apparatus, comprising:
an emitter that emits image light along a predetermined axis;
an irradiation target object that is disposed in at least a part of an area around the predetermined axis;

an optical unit that is disposed to be opposite to the emitter by using the predetermined axis as a reference and causes the emitted image light to enter the irradiation target object; and a polarization control unit that controls a polarization state of the image light that enters the irradiation target object in accordance with a shape of the irradiation target object, wherein the polarization control unit controls a polarization direction of the image light as the polarization state of the image light.

2. The image display apparatus according to claim 1, wherein the irradiation target object includes an interface that the image light enters, and the polarization control unit controls the polarization direction of the image light such that an angle of the polarization direction of the image light with respect to a normal direction of a plane of incidence is substantially constant, the plane of incidence including a direction of incidence of the image light with respect to the interface and a normal direction of the interface at a position of incidence of the image light.

3. The image display apparatus according to claim 2, wherein the polarization control unit controls the polarization direction of the image light such that the plane of incidence and the polarization direction of the image light are parallel to each other.

4. The image display apparatus according to claim 1, wherein the irradiation target object is disposed in an area all around the predetermined axis.

5. The image display apparatus according to claim 1, wherein the irradiation target object is constituted by a cylindrical shape having the predetermined axis as a substantially center axis.

6. The image display apparatus according to claim 1, wherein the optical unit controls an angle of incidence of the emitted image light with respect to the irradiation target object.

7. The image display apparatus according to claim 6, wherein the optical unit makes the angle of incidence of the image light with respect to the irradiation target object substantially constant.

8. The image display apparatus according to claim 6, wherein the optical unit includes a reflection surface that reflects the image light emitted from the emitter to the irradiation target object.

9. The image display apparatus according to claim 1, wherein the irradiation target object comprises a screen using a diffractive optical element.

10. The image display apparatus according to claim 1, wherein the irradiation target object includes at least one of a transmissive screen that transmits the image light or a reflective screen that reflects the image light.

11. The image display apparatus according to claim 1, wherein the irradiation target object is light-transmissive.

12. The image display apparatus according to claim 1, wherein the polarization control unit converts the image light into radially polarized light.

13. An image display apparatus, comprising:

an emitter that emits image light along a predetermined axis;

an irradiation target object that is disposed in at least a part of an area around the predetermined axis;

an optical unit that is disposed to be opposite to the emitter by using the predetermined axis as a reference and causes the emitted image light to enter the irradiation target object; and a polarization control unit that controls a polarization state of the image light that enters the irradiation target object in accordance with a shape of the irradiation target object, wherein the shape of the irradiation target object includes a rotationally symmetric shape having the predetermined axis as a substantially center axis, and the polarization control unit controls the polarization state such that a distribution of polarization directions of the image light are symmetric with respect to the predetermined axis.

14. The image display apparatus according to claim 13, wherein the polarization control unit converts the image light into radially polarized light.

15. An image display apparatus, comprising:

an emitter that emits image light along a predetermined axis;

an irradiation target object that is disposed in at least a part of an area around the predetermined axis;

an optical unit that is disposed to be opposite to the emitter by using the predetermined axis as a reference and causes the emitted image light to enter the irradiation target object; and a polarization control unit that controls a polarization state of the image light that enters the irradiation target object in accordance with a shape of the irradiation target object, wherein the optical unit controls an angle of incidence of the emitted image light with respect to the irradiation target object, and the optical unit controls the angle of incidence of the image light with respect to the irradiation target object to be 45° or more and 75° or less.

16. An image display apparatus, comprising:

an emitter that emits image light along a predetermined axis;

an irradiation target object that is disposed in at least a part of an area around the predetermined axis;

an optical unit that is disposed to be opposite to the emitter by using the predetermined axis as a reference and causes the emitted image light to enter the irradiation target object; and a polarization control unit that controls a polarization state of the image light that enters the irradiation target object in accordance with a shape of the irradiation target object, wherein the polarization control unit includes a rotator that rotates each of polarization directions of light rays that enter respective points in accordance with the shape of the irradiation target object.

17. The image display apparatus according to claim 16, wherein the polarization control unit includes a polarization plate that aligns the polarization directions of the entering light rays and emits linearly polarized light rays, and the rotator rotates each of the polarization directions of the linearly polarized light rays that enter respective points.

18. An image display apparatus, comprising:

an emitter that emits image light along a predetermined axis;

an irradiation target object that is disposed in at least a part of an area around the predetermined axis;

an optical unit that is disposed to be opposite to the emitter by using the predetermined axis as a reference and causes the emitted image light to enter the irradiation target object; and a polarization control unit that controls a polarization state of the image light that enters the irradiation target object in accordance with a shape of the irradiation target object, wherein the polarization control unit is disposed to be opposite to the emitter by using the predetermined axis as a reference.

19. An image display apparatus, comprising:

an emitter that emits image light along a predetermined axis;

an irradiation target object that is disposed in at least a part of an area around the predetermined axis;

an optical unit that is disposed to be opposite to the emitter by using the predetermined axis as a reference and causes the emitted image light to enter the irradiation target object; and a polarization control unit that controls a polarization state of the image light that enters the irradiation target object in accordance with a shape of the irradiation target object, wherein the polarization control unit is disposed inside the emitter, and the emitter emits the image light having the polarization state controlled along the predetermined axis.

20. The image display apparatus according to claim 19, wherein the polarization control unit includes a light-emitting element that emits the image light having the polarization state controlled.

\* \* \* \* \*